(12) United States Patent
Callegari et al.

(10) Patent No.: US 9,816,031 B2
(45) Date of Patent: Nov. 14, 2017

(54) COMPOSITE MARKING BASED ON CHIRAL LIQUID CRYSTAL PRECURSORS

(75) Inventors: Andrea Callegari, Lausanne (CH); Tristan Jauzein, Chanvannes-pres-Renens (CH)

(73) Assignee: SICPA HOLDING SA, Prilly (CH)

(*) Notice: Subject to any disclaimer, the term of this patent is extended or adjusted under 35 U.S.C. 154(b) by 1655 days.

(21) Appl. No.: 13/313,238

(22) Filed: Dec. 7, 2011

(65) Prior Publication Data

US 2012/0141697 A1 Jun. 7, 2012

Related U.S. Application Data

(60) Provisional application No. 61/420,580, filed on Dec. 7, 2010.

(30) Foreign Application Priority Data

Dec. 7, 2010 (WO) ................. PCT/EP2010/069038

(51) Int. Cl.
*B44F 1/12* (2006.01)
*B05D 5/06* (2006.01)
(Continued)

(52) U.S. Cl.
CPC ............ *C09K 19/54* (2013.01); *C09K 19/588* (2013.01); *B05D 3/02* (2013.01); *B05D 5/06* (2013.01);
(Continued)

(58) Field of Classification Search
CPC .............................................. Y10T 428/31855
See application file for complete search history.

(56) References Cited

U.S. PATENT DOCUMENTS 4,340,624 A 7/1982 Yamashita et al.
5,678,863 A 10/1997 Knight et al.
(Continued)

FOREIGN PATENT DOCUMENTS

CN 1715309 1/2006
CN 101415797 4/2009
(Continued)

OTHER PUBLICATIONS

Chinese Office Action with partial English Translation in regards to Chinese Application No. 201180058599.9, dated Feb. 28, 2014.
(Continued)

*Primary Examiner* — Gerard Higgins
*Assistant Examiner* — Sathavaram I Reddy
(74) *Attorney, Agent, or Firm* — Greenblum & Bernstein, P.L.C.

(57) ABSTRACT

A substrate having thereon a marking or layer comprising a cured chiral liquid crystal precursor composition which comprises at least one salt that changes the position of a selective reflection band exhibited by the cured composition compared to the position of a selective reflection band exhibited by a cured composition that does not contain the at least one salt. A modifying resin made from one or more polymerizable monomers is disposed between the substrate and the marking or layer and changes the position of the selective reflection band exhibited by the cured precursor composition comprising the at least one salt on the substrate in the one or more areas. This abstract is neither intended to define the invention disclosed in this specification nor intended to limit the scope of the invention in any way.

35 Claims, 7 Drawing Sheets

(51) Int. Cl.
*B05D 3/02* (2006.01)
*B32B 3/10* (2006.01)
*G09F 3/00* (2006.01)
*G06K 19/06* (2006.01)
*B42D 15/00* (2006.01)
*B32B 27/00* (2006.01)
*C09K 19/58* (2006.01)
*B05D 7/00* (2006.01)
*C09K 19/54* (2006.01)
*B44F 1/08* (2006.01)
*C09K 19/04* (2006.01)

(52) U.S. Cl.
CPC ............... *B05D 7/00* (2013.01); *B32B 3/10* (2013.01); *B32B 27/00* (2013.01); *B42D 15/00* (2013.01); *B44F 1/08* (2013.01); *C09K 2019/0448* (2013.01); *G06K 19/06* (2013.01); *G09F 3/00* (2013.01); *Y10T 428/31855* (2015.04)

(56) References Cited

U.S. PATENT DOCUMENTS

| | | | |
|---|---|---|---|
| 6,096,392 | A | 8/2000 | Nishio |
| 6,207,240 | B1 | 3/2001 | Schoenfeld et al. |
| 6,589,445 | B2 | 7/2003 | Sugiyama et al. |
| 6,733,689 | B1 | 5/2004 | Meyer et al. |
| 7,416,764 | B2 | 8/2008 | Matsumoto et al. |
| 7,742,136 | B2 | 6/2010 | Umemoto et al. |
| 7,879,256 | B2 | 2/2011 | Goldfinger et al. |
| 8,344,175 | B2 | 1/2013 | Goldfinger et al. |
| 8,632,849 | B2 | 1/2014 | Xu et al. |
| 2002/0033479 | A1 | 3/2002 | Sugiyama et al. |
| 2003/0021913 | A1* | 1/2003 | O'Neill et al. ............... 428/1.21 |
| 2003/0122105 | A1 | 7/2003 | Ichihashi et al. |
| 2006/0257633 | A1 | 11/2006 | Inoue et al. |
| 2007/0166479 | A1 | 7/2007 | Drake et al. |
| 2007/0224341 | A1 | 9/2007 | Kuntz et al. |
| 2007/0228326 | A1 | 10/2007 | Goldfinger et al. |
| 2010/0025641 | A1 | 2/2010 | Jimbo et al. |
| 2010/0103335 | A1 | 4/2010 | Bastiaansen et al. |
| 2011/0101088 | A1 | 5/2011 | Marguerettaz et al. |
| 2011/0114885 | A1 | 5/2011 | Goldfinger et al. |
| 2012/0061470 | A1 | 3/2012 | Marguerettaz et al. |
| 2013/0069003 | A1 | 3/2013 | Marguerettaz et al. |

FOREIGN PATENT DOCUMENTS

| | | |
|---|---|---|
| CN | 101417564 | 4/2009 |
| CN | 101825807 | 9/2010 |
| EP | 0216712 | 7/1989 |
| EP | 0847432 | 6/1998 |
| EP | 0890628 | 1/1999 |
| EP | 0967084 | 12/1999 |
| EP | 1681586 | 7/2006 |
| EP | 1381520 | 8/2006 |
| EP | 1710021 | 10/2006 |
| GB | 2457911 | 9/2009 |
| JP | 2008-221644 | 9/2008 |
| JP | 2008-542065 | 11/2008 |
| JP | 2008-545556 | 12/2008 |
| JP | 2009-300662 | 12/2009 |
| JP | 2010-194978 | 9/2010 |
| JP | 11-24054 | 1/2011 |
| WO | 93/22397 | 11/1993 |
| WO | 95/22586 | 8/1995 |
| WO | 03/041875 | 5/2003 |
| WO | 2005/033189 | 4/2005 |
| WO | 2006/128090 | 11/2006 |
| WO | 2006/128091 | 11/2006 |
| WO | 2008/110316 | 9/2008 |
| WO | 2009/121605 | 10/2009 |
| WO | 2010/115879 | 10/2010 |
| WO | 2010/124396 | 11/2010 |
| WO | 2011/069691 | 6/2011 |

OTHER PUBLICATIONS

U.S. Appl. No. 13/313,242 to Andrea Callegari et al., filed Dec. 7, 2011.
J.L. Fergason, Molecular Crystals, vol. 1, pp. 293-307 (1966).
BASF, Paliocolor LC 242 and LC 756, Tehnical Information Sep. 2002, 5 pages.
International Search Report and Written Opinion in PCT/EP2010/069051 dated Aug. 31, 2011.
International Search Report and Written Opinion in PCT/EP2010/069038 dated Sep. 26, 2011.
New Zealand Office Action in regards to New Zealand Application No. 609945, dated Mar. 13, 2014.
Chinese Office Action with English Translation in regards to Chinese Application No. 201180058599.9, dated Nov. 4, 2014.
European Office Action in respect to European Application No. 118504509.5, dated Jun. 2, 2014.
International Search Report in respect to International Application No. PCT/EP2011/071936, dated Apr. 12, 2012.
Columbian Office action in respect to Columbian Application No. 13-137.647, dated Sep. 30, 2015.
Yoshiyuki Nishio et al., "Salt Addition Effects on Mesophase Structure and Optical Properties of Aqueous Hydroxypropl Cellulose Solutions", Polymer Journal, vol. 34, No. 3, pp. 149-157, 2002.
Taiwanese Office Action and Search Report with English Translation in respect to Taiwanese Application No. 100144995, dated Jul. 14, 2015.
Eurasian Office Action with English Translation in respect Eurasian Appl. No. 201390730/31, dated May 7, 2015.
Japanese Office Action with English Translation in respect to Japanese Application No. 2013-542508, dated May 26, 2015.
Israeli Office Action in respect to Israeli Application No. 225936, dated Jan. 1, 2015.
Columbian Office Action with partial English summary in respect to Columbian Application No. 13-137647, dated Apr. 21, 2015.

* cited by examiner

COMPOSITE MARKING BASED ON CHIRAL LIQUID CRYSTAL PRECURSORS

CROSS-REFERENCE TO RELATED APPLICATIONS

The present application claims the benefit under 35 U.S.C. §119(e) of U.S. Provisional Application No. 61/420,580, filed Dec. 7, 2010 and claims priority under 35 U.S.C. §119 of International Patent Application No. PCT/EP2010/069038, filed Dec. 7, 2010. The entire disclosures of these applications are expressly incorporated by reference herein.

BACKGROUND OF THE INVENTION

1. Field of the Invention

The present invention relates to a composite marking based on chiral nematic (also called cholesteric) liquid crystal precursors and in particular, a marking wherein a modifying resin changes the position of the selective reflection band exhibited by a cured chiral liquid crystal precursor composition in the chiral liquid crystal state. The invention also relates to a method of providing a substrate with the composite marking and to a method of changing the selective reflection band exhibited by a cured chiral liquid crystal precursor composition on a substrate.

2. Discussion of Background Information

Counterfeit is no longer a national or a regional problem but a worldwide problem which has an impact not only on manufacturers but also on the consumer. Counterfeiting is a significant problem with goods like clothes and watches but becomes even more serious when it affects medicines and drugs. Each year thousands of people around the world die because of counterfeit drugs. Counterfeiting has also an impact on government revenues in that it affects the collection of taxes for, e.g., cigarettes and alcohol because of the existence of a black market where it is impossible to track and trace counterfeit (smuggled, diverted, etc.) products with no valid tax stamps.

Many solutions have been proposed to make counterfeiting impossible or at least very difficult and/or costly, for example RFID solutions and the use of invisible inks.

More recently, a security feature has emerged and is used to authenticate a genuine product such as a drug and to avoid counterfeiting. This technology is based on optically variable inks. Its principle is based on the difference in observable color of a marking made with optically variable inks when a packaging, security document, etc. carrying the marking is viewed from different angles ("viewing-angle dependent color").

Optically variable inks provide first-line recognizability not only by a person, but also facilitate machine-readability. Many patents describe this security product, its composition and its application. One example of the many types of optically variable inks is the class of compounds called cholesteric liquid crystals. When illuminated with white light, the cholesteric liquid crystal structure reflects light of a certain color which depends on the material in question and generally varies with the viewing angle and the temperature. The cholesteric material itself is colorless and the observed color is the result of a physical reflection effect at the cholesteric helical structure that is adopted by the liquid crystal precursor composition at a given temperature. See, e.g., J. L. Fergason, Molecular Crystals, Vol. 1, pp. 293-307 (1966), the entire disclosure of which is incorporated by reference herein.

EP-A-1 381 520 and EP-A-1 681 586, the entire disclosures of which are incorporated by reference herein, disclose a birefringent marking and a method of applying the same in the form of a liquid crystal layer having a non-uniform pattern of regions of different thickness. The applied liquid crystal coating or layer may provide for a hidden image on a reflected substrate, which image is invisible when viewed under non-polarized light but is rendered visible under polarized light or with the help of a polarization filter.

U.S. Pat. No. 5,678,863, the entire disclosure of which is incorporated by reference herein, discloses means for the identification of documents of value which include a paper or polymer region, said region having a transparent and translucent characteristic. A liquid crystal material is applied to the region to produce an optical effect, which differs when viewed in transmitted and reflected light. The liquid crystal material is in liquid form at room temperature and must be enclosed in a containing means such as microcapsules in order to be suitable for use in a printing process such as gravure, roller, spray or ink-jet printing.

The ordered liquid crystalline state depends upon the presence of a chiral dopant. Nematic liquid crystals without chiral dopant show a molecular arrangement that is characterized by its birefringence. Nematic polymers are known from, e.g., EP-A-0 216 712, EP-A-0 847 432, and U.S. Pat. No. 6,589,445, the entire disclosures of which are incorporated by reference herein.

As mentioned above, the liquid crystal based security feature provides first-line recognizability by the consumer and also by retailers and producers of goods and articles. Like for many other security features which are used in the market, there is always the temptation of counterfeiters to reproduce these security features and therefore misleads consumers and retailers. In view of the foregoing facts, there continues to be a need to improve the security of liquid crystal polymer materials based on liquid crystal precursors.

One possibility of enhancing the security level of a chiral liquid crystal polymer film would appear to be superposing a code in the form of a pattern, indicia, a bar code, etc. on the liquid crystal polymer film. However, there is always a risk that a counterfeiter tampers with the code and manually applies it onto the liquid crystal polymer film.

A second possibility of overcoming this problem is to insert the code inside the liquid crystal polymer film. For example, U.S. Pat. No. 6,207,240, the entire disclosure of which is incorporated by reference herein, describes an effect coating of a cholesteric liquid crystal polymer (CLCP) with viewing angle dependent reflection color that further comprises absorption type pigments exhibiting a specific absorption color. A marking, such as a symbol or a text, is generated in the CLCP coating by laser irradiation. The laser radiation carbonizes the CLCP material in the irradiated area. As a result, the color of the substrate on which the CLCP is coated, or the color of absorption pigments incorporated into the CLCP, becomes visible in the irradiated area. However, the method requires high-power lasers to carbonize the material and to make the markings visible.

Another possibility is described in US 2006/0257633 A1, the entire disclosure of which is incorporated by reference herein, which is applied not only to liquid crystal polymers but to polymers in general. The method consists of applying a permeating substance to a predetermined region on the surface of the polymer substrate and bringing a supercritical fluid into contact with the surface of the polymer substrate to which the permeating substance has been applied to cause the permeating substance to permeate into the polymer substrate. The method makes it possible to selectively (partially) modify a portion of the surface of the polymer. However, for industrial processes where a high marking speed for a large number of items is required the method is complex and expensive to implement.

One of the drawbacks of the methods cited above is the lack of ability to modify the chiral liquid crystal polymer layer in a selective and controlled manner and to create a strong and reliable marking or coding that is difficult, if not impossible, to reproduce and also is compatible with a production line (processes for making items such as passports, packaging, etc.).

SUMMARY OF THE INVENTION

The present invention provides a substrate having thereon a marking or layer that comprises a cured chiral liquid crystal precursor composition (when in a chiral liquid crystal state). The chiral liquid crystal precursor composition comprises at least one salt that changes (usually in a concentration-dependent manner) the position of a selective reflection band ($\lambda_{max}$) exhibited by the cured composition (in a chiral liquid crystal state) compared to the position of the selective reflection band exhibited by an (otherwise identical) cured composition that does not contain the at least one salt. Further, a modifying resin made from one or more polymerizable monomers is disposed between the substrate and the marking or layer and in contact with the marking or layer in one or more areas thereof. The modifying resin changes the position of the selective reflection band exhibited by the cured chiral liquid crystal precursor composition (when in a chiral liquid crystal state) on the substrate in the one or more areas. The present invention also provides a marking or layer that is locally modified by a modifying resin as such (i.e., without the presence of a substrate). The term "modifying resin" as used in the present specification and in the appended claims includes cured resins as set forth below, and also includes aqueous resins such as, e.g., polyamide resins (for example, CAS No. 175893-71-7, CAS No. 303013-12-9, CAS No. 393802-62-5, CAS No. 122380-38-5, CAS No 9003-39-8), alkyd resins (e.g. of the polyester type), and polyacrylates.

In one aspect, the chiral liquid crystal precursor composition may comprise (i) one or more (e.g. two, three, four, five or more and in particular, at least two) different nematic compounds A and (ii) one or more (e.g., two, three, four, five or more) different chiral dopant compounds B which are capable of giving rise to a cholesteric state of the chiral liquid crystal precursor composition upon heating. Further, both the one or more nematic compounds A and the one or more chiral dopant compounds B may comprise at least one compound which comprises at least one polymerizable group. For example, all of the one or more nematic compounds A and all of the one or more chiral dopant compounds B may comprise at least one polymerizable group. The at least one polymerizable group may, for example, comprise a group which is able to take part in a free radical polymerization and in particular, a (preferably activated) unsaturated carbon-carbon bond such as, e.g., a group of formula $H_2C=CH-C(O)-$.

In another aspect of the substrate and marking of the present invention, the chiral liquid crystal precursor composition may comprise at least one chiral dopant compound B of formula (I):

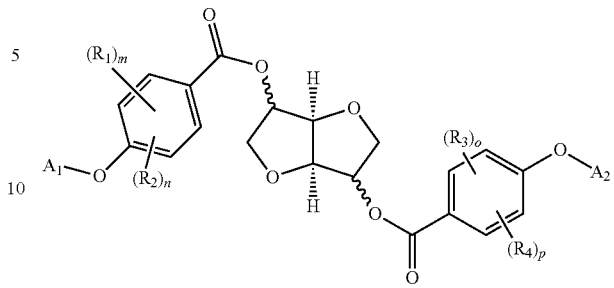

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

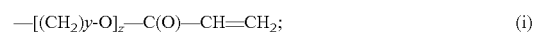

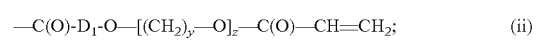

$D_1$ denotes a group of formula

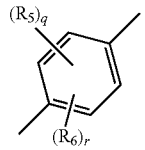

$D_2$ denotes a group of formula

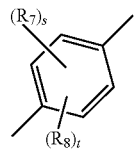

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In yet another aspect of the substrate and marking of the present invention the at least one salt (e.g., one, two, three or more different salts) that changes the position of the selective reflection band exhibited by the cured chiral liquid crystal precursor composition (regardless of whether or not the polymer is present on a substrate) may be selected from metal salts and (preferably quaternary) ammonium salts. For example, the at least one salt may comprise at least one salt of a metal such an alkali or alkaline earth metal (e.g., Li, Na), for example, one or more of lithium perchlorate, lithium nitrate, lithium tetrafluoroborate, lithium bromide, lithium chloride, sodium carbonate, sodium chloride, sodium nitrate, and/or one or more (organically substituted) ammonium salts such as tetraalkylammonium salts, for example, one or more of tetrabutylammonium perchlorate, tetrabutylammonium chloride, tetrabutylammonium tetrafluoroborate, and tetrabutylammonium bromide.

In a still further aspect of the substrate/marking of the present invention, at least one of the one or more polymerizable monomers for providing the modifying resin for changing the position of the selective reflection band exhibited by the cured chiral liquid crystal precursor composition may comprise at least two unsaturated carbon-carbon bonds and/or at least one of the one or more polymerizable monomers may comprise at least one heteroatom, preferably selected from O, N and S and in particular, O and/or N. For example, at least one of the one or more polymerizable monomers for providing the modifying resin may comprise one or more groups (e.g., one, two, three, four, five, six, or more groups) of formula $H_2C=CH—C(O)—$ or $H_2C=C(CH_3)—C(O)—$. Non-limiting examples of corresponding monomers include polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, dipropylene glycol diacrylates, hexanediol diacrylates, ethoxylated trimethylol propane triacrylates, and tripropylene glycol diacrylates.

In another aspect of the substrate/marking of the present invention the modifying resin for changing the position of the selective reflection band exhibited by the (salt-containing) cured chiral liquid crystal precursor composition may comprise a radiation-cured resin, for example, a UV-cured resin. Another type of resin that can be used in the present invention are aqueous resins, such as polyamide resins, for example CAS No. 175893-71-7, CAS No. 303013-12-9, CAS No. 393802-62-5, CAS No. 122380-38-5, CAS No. 9003-39-8.

In another aspect, the modifying resin may shift the position of the selective reflection band exhibited by the salt-containing cured chiral liquid crystal precursor composition by at least about 5 nm and/or may shift the position to shorter wavelengths and/or the shifted position of the selective reflection band may be in the visible range. In this regard, it is noted that "shifting the position of the selective reflection band" as used herein and in the appended claims means shifting $\lambda_{max}$ as measured using an analytical spectral device that measures the reflectance of a sample in the infrared-near-infrared-visible-UV range of the spectrum, such as the LabSpec Pro device made by Analytical Spectral Devices Inc. of Boulder, Colo.

In yet another aspect, at least one of the one or more areas of the substrate which carry the modifying resin may be in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix, and/or at least a part of the cured chiral liquid crystal precursor composition may be in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

In a still further aspect, the substrate of the present invention may be or comprise at least one of a label, packaging, a cartridge, a container or a capsule that contains pharmaceuticals, nutraceuticals, foodstuffs or a beverage (such as, e.g., coffee, tea, milk, chocolate, etc.), a banknote, a credit card, a stamp, a tax label, a security document, a passport, an identity card, a driver's license, an access card, a transportation ticket, an event ticket, a voucher, an ink-transfer film, a reflective film, an aluminum foil, and a commercial good. The marking according to the present invention can also be created on a substrate such as, e.g., a film or sheet of polyethylene terephthalate (PET) or polyolefin such as polyethylene for later transfer to a permanent substrate (e.g., one of the substrates set forth in the preceding sentence).

The present invention further provides a method of providing a marking on a substrate. The method comprises the application of a curable chiral liquid crystal precursor composition onto a surface of a substrate which carries in one or more areas of the surface of the substrate a modifying resin made from one or more polymerizable monomers. The curable chiral liquid crystal precursor composition comprises at least one salt which changes the position of the selective reflection band exhibited by the cured chiral liquid crystal precursor composition (when in a chiral liquid crystal state) compared to the position of the selective reflection band exhibited by the cured chiral liquid crystal precursor composition that does not contain the at least one salt. Further, the modifying resin is capable of changing the position of the selective reflection band exhibited by the salt-containing cured chiral liquid crystal precursor composition on the substrate in the one or more areas in which it is present. The curable chiral liquid crystal precursor composition is applied in such a way that the composition covers at least a part of the one or more areas that carry the modifying resin and also covers at least one area of the surface of the substrate that does not carry the modifying resin. The method further comprises the heating of the applied chiral liquid crystal precursor composition to bring same to a chiral liquid crystal state; and the curing of the composition in the chiral liquid crystal state (e.g., by radiation, such as UV-radiation).

In one aspect of the method of the present invention, the chiral liquid crystal precursor composition may be heated to a temperature of from about 55° C. to about 150° C. to bring the chiral liquid crystal precursor composition to a chiral liquid crystal state.

In another aspect of the method, the liquid crystal precursor composition may be applied onto the substrate by at least one of spray coating, knife coating, roller coating, screen coating, curtain coating, gravure printing, flexography, screen-printing, pad printing, and ink-jet printing (for example continuous ink-jet printing, drop-on-demand ink-jet printing, valve-jet printing), and/or may be applied in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

In yet another aspect, the modifying resin may be present in at least one of the one or more areas in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix and/or may have been provided on the substrate by at least one of continuous ink-jet printing, drop-on-demand ink-jet printing, valve-jet printing, spray coating, flexography, gravure printing, offset, dry offset printing, letterpress printing, pad printing and screen printing.

In a still further aspect, the substrate may be or may comprise at least one of a label, packaging, a cartridge, a container or a capsule that contains pharmaceuticals, nutraceuticals, foodstuffs or a beverage (such as, e.g., coffee, tea, milk, chocolate, etc.), a banknote, a credit card, a stamp, a tax label, a security document, a passport, an identity card, a driver's license, an access card, a transportation ticket, an event ticket, a voucher, an ink-transfer film, a reflective film, an aluminum foil, and a commercial good.

In another aspect, the modifying resin may be capable of shifting the position of the selective reflection band exhibited by the (salt-containing) cured chiral liquid crystal precursor composition on the substrate by at least about 5 nm.

In another aspect of the method of the present invention, the chiral liquid crystal precursor composition may comprise (i) one or more (e.g. two, three, four, five or more and in particular, at least two) different nematic compounds A and (ii) one or more (e.g., two, three, four, five or more) different chiral dopant compounds B which are capable of giving rise to a cholesteric state of the chiral liquid crystal precursor composition upon heating. Further, both the one or more nematic compounds A and the one or more chiral dopant compounds B may comprise at least one compound which comprises at least one polymerizable group. For example, all of the one or more nematic compounds A and all of the one or more chiral dopant compounds B may comprise at least one polymerizable group. The at least one polymerizable group may, for example, comprise a group which is able to take part in a free radical polymerization and in particular, a (preferably activated) unsaturated carbon-carbon bond such as, e.g., a group of formula $H_2C=CH-C(O)-$.

In another aspect of the method of the present invention, the chiral liquid crystal precursor composition may comprise at least one chiral dopant compound B of formula (I):

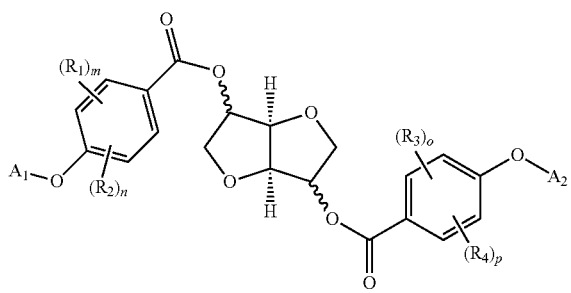

(I)

wherein:
$R_1, R_2, R_3, R_4, R_5, R_6, R_7$ and $R_8$ each independently denote $C_1$-$C_6$ alkyl and $C_1$-$C_6$ alkoxy;
$A_1$ and $A_2$ each independently denote a group of formula (i) to (iii):

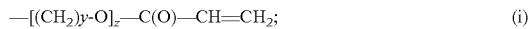

$-[(CH_2)_y-O]_z-C(O)-CH=CH_2$; (i)

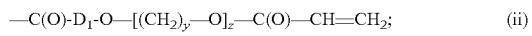

$-C(O)-D_1-O-[(CH_2)_y-O]_z-C(O)-CH=CH_2$; (ii)

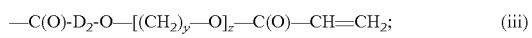

$-C(O)-D_2-O-[(CH_2)_y-O]_z-C(O)-CH=CH_2$; (iii)

$D_1$ denotes a group of formula

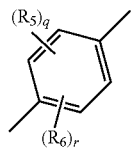

$D_2$ denotes a group of formula

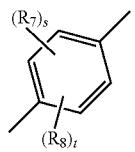

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In yet another aspect of the method of the present invention, the at least one salt (e.g., one, two, three or more different salts) that changes the position of the selective reflection band exhibited by the cured chiral liquid crystal precursor (regardless of whether or not the polymer is present on a substrate) may be selected from metal salts and (preferably quaternary) ammonium salts. For example, the at least one salt may comprise at least one salt of a metal such an alkali or alkaline earth metal (e.g., Li, Na), for example, one or more of lithium perchlorate, lithium nitrate, lithium tetrafluoroborate, lithium bromide, lithium chloride, sodium carbonate, sodium chloride, sodium nitrate and/or one or more (organically substituted) ammonium salts such as tetraalkylammonium salts, for example, one or more of tetrabutylammonium perchlorate, tetrabutylammonium chloride, tetrabutylammonium tetrafluoroborate, and tetrabutylammonium bromide.

In one aspect, the one or more salts may comprise a metal such as, e.g., an alkali metal and/or an alkaline earth metal. For example, the metal may be selected from one or more of Li, Na.

In a still further aspect of the method of the present invention, at least one of the one or more polymerizable monomers for providing the modifying resin for changing the position of the selective reflection band exhibited by the cured (salt-containing) chiral liquid crystal precursor composition may comprise at least two unsaturated carbon-carbon bonds and/or at least one of the one or more polymerizable monomers may comprise at least one heteroatom selected from O, N and S and in particular O and/or N. For example, at least one of the one or more polymerizable monomers for providing the modifying resin may comprise one or more groups (e.g., one, two, three, four, five, six, or more groups) of formula $H_2C=CH-C(O)-$ or $H_2C=C(CH_3)-C(O)-$. Non-limiting examples of corresponding monomers include polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, dipropylene glycol diacrylates, hexanediol diacrylates, ethoxylated trimethylol propane triacrylates, and tripropylene glycol diacrylates. Another type of resin that can be used in the present invention are aqueous resins such as polyamide resins, for example CAS No. 175893-71-7, CAS No. 303013-12-9, CAS No. 393802-62-5, CAS No. 122380-38-5, CAS No. 9003-39-8.

In another aspect of the method of the present invention, the modifying resin may comprise a radiation-cured resin, for example, a UV-cured resin. In another aspect of the method of the present invention, the modifying resin may comprise an aqueous resin which may be dried by conventional means such as heat.

The present invention further provides a substrate that is provided with a marking, wherein the substrate is obtainable by the method of the present invention as set forth above (including the various aspects thereof).

The present invention also provides a method of shifting the position of the selective reflection band exhibited by a chiral liquid crystal precursor made from a composition comprising (i) one or more nematic compounds, (ii) one or more chiral dopant compounds which are capable of giving rise to a cholesteric state of the chiral liquid crystal precursor, and (iii) at least one salt that changes the position of the selective reflection band exhibited by the cured composition compared to the position of the selective reflection band exhibited by the cured composition that does not contain the at least one salt. The method comprises contacting the chiral liquid crystal precursor composition with a modifying resin which is made from one or more polymerizable monomers, at least one of the monomers comprising a heteroatom selected from O, N, and S, and is capable of changing the position of the selective reflection band exhibited by the cured chiral liquid crystal precursor composition. The chiral liquid crystal precursor composition is then heated to a temperature of from about 55° C. to about 150° C. to bring it to a chiral liquid crystal state. Thereafter the chiral liquid crystal precursor composition is cured.

In one aspect of the method, the position of the selective reflection band may be shifted by at least about 5 nm. Other aspects of the method such as, e.g., aspects relating to components (i), (ii) and (iii) include those set forth above with respect to the substrate/marking of the present invention.

BRIEF DESCRIPTION OF THE DRAWINGS

The present invention is further described in the detailed description which follows, in reference to the plurality of drawings by way of non-limiting examples of exemplary embodiments of the present invention, and wherein.

DETAILED DESCRIPTION OF THE PRESENT INVENTION

Figure 1:
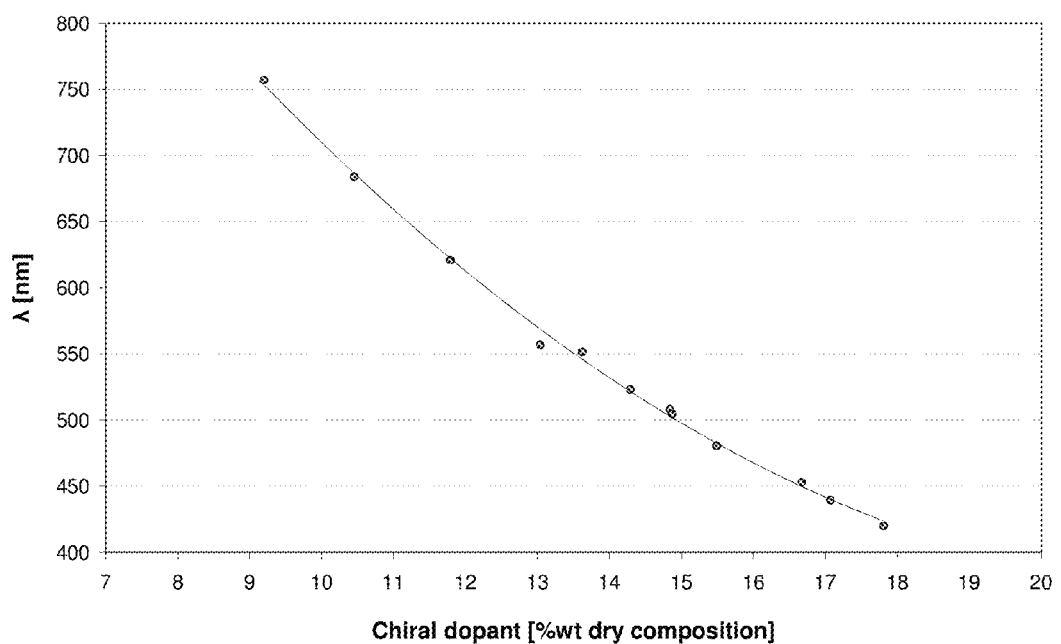
FIG. 1 is a diagram showing the position of the selective reflection band ($\lambda_{max}$) of a cured chiral liquid crystal precursor composition suitable for use in the present invention as a function of the concentration of the chiral dopant contained therein, based on dry matter.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The substrate for use in the present invention is not particularly limited and can be of various types. The substrate may, for example, consist (essentially) of or comprise one or more of a metal (for example, in the form of a container such as a can, a capsule or a closed cartridge for holding various items such as, e.g., nutraceuticals, pharmaceuticals, beverages or foodstuffs), a fabric, a coating, and equivalents thereof, glass (for example, in the form of a container such as a bottle for holding various items such as, e.g., nutraceuticals, pharmaceuticals, beverages or foodstuffs), cardboard (e.g., in the form of packaging), paper, and a polymeric material such as, e.g., PET or polyethylene (e.g., in the form of a container or as a part of a security document). It is pointed out that these substrate materials are given exclusively for exemplifying purposes, without restricting the scope of the invention. In general, any substrate (which may not necessarily be flat and may be uneven) whose surface is not soluble, or only slightly soluble, in solvent(s) used in the chiral liquid polymer precursor composition is a suitable substrate for the purposes of the present invention.

The substrate may advantageously have a dark or black surface or background onto which the precursor composition is to be applied. Without wishing to be bound by any theory, it is speculated that in the case of a dark or black background the light transmitted by the cholesteric liquid crystal material is largely absorbed by the background, whereby any residual backscattering from the background does not disturb the perception of the cholesteric liquid crystal material's own reflection with the unaided eye. In contrast, on a substrate with a light or white surface or background the reflection color of the cholesteric liquid crystal material is less visible when compared with a black or dark background, due to the strong backscattering from the background. However, even in the case of a light or white background a cholesteric liquid crystal material can be recognized with the help of a circular polarization filter because it selectively reflects only one of the two possible circular polarized light components, in accordance with its chiral helical structure. The substrate according to the present invention may further comprise additional security elements, such as organic and/or inorganic pigments, dyes, flakes, optically variable elements, magnetic pigments, etc.

The chiral liquid crystal precursor composition that is used for making the marking according to the present invention and is applied (e.g., deposited) onto at least a part of at least one surface of the substrate (and over at least a part of the modifying resin on the at least one surface of the substrate) preferably comprises a mixture of (i) one or more nematic compounds A and (ii) one or more cholesteric (i.e., chiral dopant) compounds B (including cholesterol) which are capable of giving rise to a cholesteric state of the composition. The pitch of the obtainable cholesteric state depends on the relative ratio of the nematic and the cholesteric compounds. Typically, the (total) concentration of the one or more nematic compounds A in the chiral liquid crystal precursor composition for use in the present invention will be about four to about fifty times the (total) concentration of the one or more cholesteric compounds B. Often, a chiral liquid crystal precursor composition with a high concentration of cholesteric compounds is not desirable (although possible in many cases) because the one or more cholesteric compounds tend to crystallize, thereby making it impossible to obtain the desired liquid crystal state having specific optical properties.

Nematic compounds A which are suitable for use in the chiral liquid crystal precursor composition are known in the art; when used alone (i.e., without cholesteric compounds) they arrange themselves in a state characterized by its birefringence. Non-limiting examples of nematic compounds A which are suitable for use in the present invention are described in, e.g., WO 93/22397, WO 95/22586, EP-B-0 847 432, U.S. Pat. No. 6,589,445, US 2007/0224341 A1 and JP 2009-300662 A. The entire disclosures of these documents are incorporated by reference herein.

A preferred class of nematic compounds for use in the present invention comprises one or more (e.g., 1, 2 or 3) polymerizable groups, identical or different from each other, per molecule. Examples of polymerizable groups include groups which are capable of taking part in a free radical polymerization and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the present invention further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formulae (i) to (iii) which are indicated above as meanings for $A_1$ and $A_2$ in formula (I) (and formulae (IA) and (IB)), typically bonded to optionally substituted phenyl groups. Specific non-limiting examples of nematic compounds which are suitable for use in the present invention are given below in the Example.

The one or more cholesteric (i.e., chiral dopant) compounds B for use in the present invention preferably comprise at least one polymerizable group.

As set forth above, suitable examples of the one or more chiral dopant compounds B include those of formula (I):

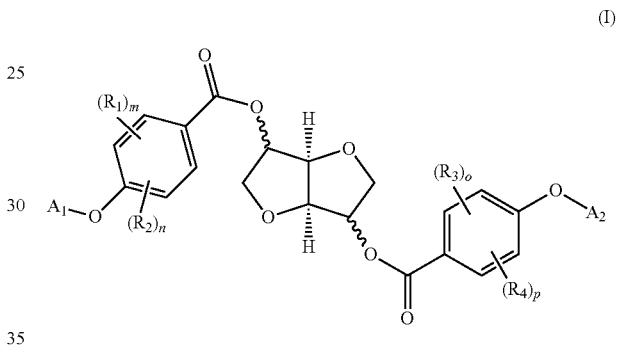

(I)

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

$$—[(CH_2)_y\text{-}O]_z—C(O)—CH{=}CH_2; \quad\quad (i)$$

$$—C(O)\text{-}D_1\text{-}O—[(CH_2)_y—O]_z—C(O)—CH{=}CH_2; \quad\quad (ii)$$

$$—C(O)\text{-}D_2\text{-}O—[(CH_2)_y—O]_z—C(O)—CH{=}CH_2; \quad\quad (iii)$$

$D_1$ denotes a group of formula

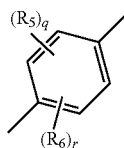

$D_2$ denotes a group of formula

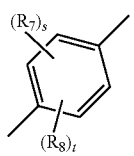

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one aspect, the one or more chiral dopant compounds B may comprise one or more isomannide derivatives of formula (IA):

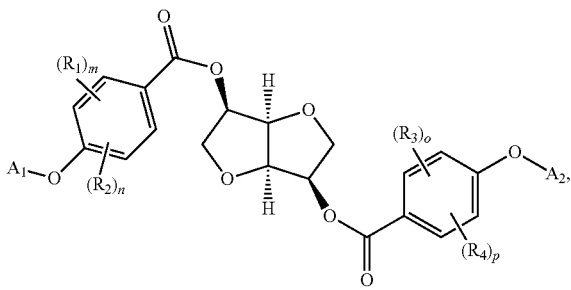

(IA)

wherein:
$R_1, R_2, R_3, R_4, R_5, R_6, R_7$ and $R_8$ each independently denote $C_1$-$C_6$ alkyl and $C_1$-$C_6$ alkoxy;
$A_1$ and $A_2$ each independently denote a group of formula (i) to (iii):

—[(CH$_2$)y-O]z-C(O)—CH=CH$_2$;  (i)

—C(O)-D$_1$-O—[(CH$_2$)y-O]z-C(O)—CH=CH$_2$;  (ii)

—C(O)-D$_2$-O—[(CH$_2$)y-O]z-C(O)—CH=CH$_2$;  (iii)

$D_1$ denotes a group of formula

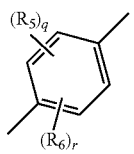

$D_2$ denotes a group of formula

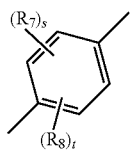

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formula (IA) (and of compounds of formula (I)), $R_1, R_2, R_3, R_4, R_5, R_6, R_7$ and $R_8$ each independently denote $C_1$-$C_6$ alkyl. In an alternative embodiment, $R_1, R_2, R_3, R_4, R_5, R_6, R_7$ and $R_8$ in formula (IA) (and in formula (I)) each independently denote $C_1$-$C_6$ alkoxy.

In another embodiment of the compounds of formula (I) and of formula (IA), $A_1$ and $A_2$ each independently denote a group of formula —[(CH$_2$)$_y$—O]$_z$—C(O)—CH=CH$_2$; $R_1, R_2, R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula —[(CH$_2$)$_y$—O]$_z$—C(O)—CH=CH$_2$; $R_1, R_2, R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula —C(O)-D$_1$-O—[(CH$_2$)$_y$—O]$_z$—C(O)—CH=CH$_2$ and/or of formula —C(O)-D$_2$-O—[(CH$_2$)$_y$—O]$_z$—C(O)—CH=CH$_2$; and $R_1, R_2, R_3, R_4, R_5, R_6, R_7$ and $R_8$ each independently denote $C_1$-$C_6$ alkyl. In an alternative embodiment, $A_1$ and $A_2$ in formula (IA) (and in formula (I)) each independently denote a group of formula —C(O)-D$_1$-O—[(CH$_2$)$_y$—O]$_z$—C(O)—CH=CH$_2$ and/or a group of formula —C(O)-D$_2$-O—[(CH$_2$)$_y$—O]$_z$—C(O)—CH=CH$_2$; and $R_1, R_2, R_3, R_4, R_5, R_6, R_7$ and $R_8$ each independently denote $C_1$-$C_6$ alkoxy.

In another aspect, the one or more chiral dopant compounds B may comprise one or more isosorbide derivatives represented by formula (IB):

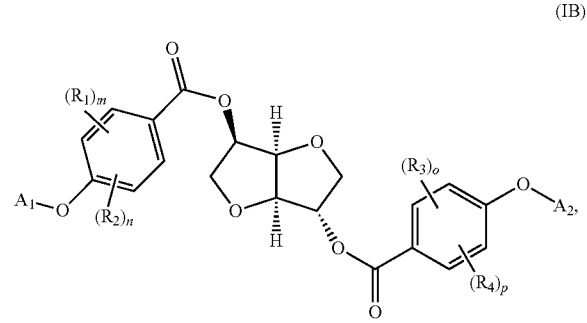

(IB)

wherein:
$R_1, R_2, R_3, R_4, R_5, R_6, R_7$ and $R_8$ each independently denote $C_1$-$C_6$ alkyl and $C_1$-$C_6$ alkoxy;
$A_1$ and $A_2$ each independently denote a group of formula (i) to (iii):

—[(CH$_2$)y-O]z-C(O)—CH=CH$_2$;  (i)

—C(O)-D$_1$-O—[(CH$_2$)y-O]z-C(O)—CH=CH$_2$;  (ii)

—C(O)-D$_2$-O—[(CH$_2$)y-O]z-C(O)—CH=CH$_2$;  (iii)

$D_1$ denotes a group of formula

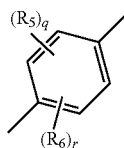

$D_2$ denotes a group of formula

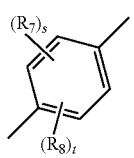

m, n, o, p, q, r, s, and t each independently denote 0, 1, or 2;

y denotes 0, 1, 2, 3, 4, 5, or 6;

z equals 0 if y equals 0 and z equals 1 if y equals 1 to 6.

In one embodiment of the compounds of formula (IB), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IB) each independently denote $C_1$-$C_6$ alkoxy.

In another embodiment of the compounds of formula (IB), $A_1$ and $A_2$ each independently denote a group of formula $-[(CH_2)_y-O]_z-C(O)-CH=CH_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (IB) each independently denote a group of formula $-[(CH_2)_y-O]_z-C(O)-CH=CH_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IB), $A_1$ and $A_2$ each independently denote a group of formula $-C(O)-D_1-O-[(CH_2)_y-O]_z-C(O)-CH=CH_2$ and/or of formula $-C(O)-D_2-O-[(CH_2)_y-O]_z-C(O)-CH=CH_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IB) each independently denote a group of formula $-C(O)-D_1-O-[(CH_2)_y-O]_z-C(O)-CH=CH_2$ and/or a group of formula $-C(O)-D_2-O-[(CH_2)_y-O]_z-C(O)-CH=CH_2$; and $R_1$, $R_2$, $R_3$, $R_4$, $R_5$, $R_6$, $R_7$ and $R_8$ each independently denote $C_1$-$C_6$ alkoxy.

In a preferred embodiment, the alkyl and alkoxy groups of $R_1$, $R_2$, $R_3$, $R_4$, $R_5$, $R_6$, $R_7$ and $R_8$ in formulae (I), (IA) and (IB) may comprise 3, 4, 6 or 7 carbon atoms and in particular, 4 or 6 carbon atoms.

Examples of alkyl groups comprising 3 or 4 carbon atoms include isopropyl and butyl. Examples of alkyl groups comprising 6 or 7 carbon atoms include hexyl, 2-methylpentyl, 3-methylpentyl, 2,2-dimethylpentyl, and 2,3-dimethylpentyl.

Examples of alkoxy groups comprising 3 or 4 carbon atoms include isopropoxy, but-1-oxy, but-2-oxy, and tert-butoxy. Examples of alkoxy groups comprising 6 or 7 carbon atoms include hex-1-oxy, hex-2-oxy, hex-3-oxy, 2-methylpent-1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylpent-1-oxy, 2,2-dimethylpent-3-oxy, 2,2-dimethylpent-4-oxy, 4,4-dimethylpent-1-oxy, 2,3-dimethylpent-1-oxy, 2,3-dimethylpent-2-oxy, 2,3-dimethylpent-3-oxy, 2,3-dimethylpent-4-oxy, and 3,4-dimethylpent-1-oxy.

Non-limiting specific examples of chiral dopant compounds B of formula (I) for use in the present invention are provided in the Examples below.

The one or more chiral dopant compounds B will usually be present in a total concentration of from about 0.1% to about 30% by weight, e.g., from about 0.1% to about 25%, or from about 0.1% to about 20% by weight, based on the total weight of the composition. For example, in the case of inkjet printing the best results will often be obtained with concentrations of from 3% to 10% by weight, e.g., from 5% to 8% by weight, based on the total weight of the polymer composition. The one or more nematic compounds A will often be present in a concentration of from about 30% to about 50% by weight, based on the total weight of the polymer composition.

One component of the chiral liquid crystal precursor composition for use in the present invention is a salt and in particular, a salt that is capable of changing the position of the selective reflection band exhibited by the cured chiral liquid crystal precursor composition (in the chiral liquid crystal state) compared to the position of the selective reflection band exhibited by the cured composition without the salt. Regarding the selective reflection band exhibited by a chiral liquid crystal the explanations in U.S. Pat. No. 7,742,136 or US 2010/0025641, the entire disclosures of which are expressly incorporated by reference herein, may, for example, be referred to.

The extent to which the position of the selective reflection band exhibited by a given cured chiral liquid crystal precursor composition can be shifted by the presence of a salt depends on various factors such as, inter alia, the cation of the salt, the anion of the salt, and the concentration of the salt per gram of dry extract. In this regard, the Examples below may be referred to. Usually it is preferred for a salt to be present in a given chiral liquid crystal precursor at a concentration which shifts the position of the selective reflection band exhibited by a cured chiral liquid crystal precursor composition by at least about 5 nm, e.g., by at least about 10 nm, by at least about 20 nm, by at least about 30 nm, by at least about 40 nm, or by at least about 50 nm. Suitable (total) salt concentrations are often within the range of from about 0.01% to about 10% by weight, e.g., from about 0.1% to about 5% by weight, based on the solids content of the chiral liquid crystal precursor composition.

Non-limiting examples of suitable salts include salts which comprise a metal cation (main group metals, transition metals, lanthanides and actinides). For example, the metal may be an alkali or alkaline earth metal such as, e.g., Li, Na. Further non-limiting examples of suitable salts include quaternary ammonium salts such as tetraalkylammonium salts. Examples of suitable anions include "regular" ions such as, e.g., halide (e.g., fluoride, chloride, bromide, iodide), perchlorate, nitrate, nitrite, sulfate, sulfonate, sulfite, carbonate, bicarbonate, cyanide, cyanate, and thiocyanate, as well as complex ions such as, e.g., tetrafluoroborate. Of course, mixtures of two or more salts (e.g., two, three, four or more salts) may be used as well. If two or more salts are present, they may or may not comprise the same cation and/or the same anion.

The modifying resin for use in the present invention is not particularly limited as long as it is capable of changing the position of the selective reflection band exhibited by the cured chiral liquid crystal precursor composition on the substrate to a noticeable extent. In this regard, it is preferred for the resin to be capable of shifting the position of the selective reflection band by at least about 5 nm, e.g., by at least about 10 nm, by at least about 20 nm, by at least about 30 nm, by at least about 40 nm, or by at least about 50 nm. This capability depends on various factors such as, inter alia, the components of the chiral liquid crystal precursor composition, for example, the salt(s) and the chiral dopant(s) comprised therein, and the presence or absence of functional groups in the modifying resin (and thus on the surface thereof).

Examples of modifying resins which are suitable for use in the present invention include those made from (one, two, three, four or more) polymerizable monomers which include one or more (e.g., two or three) heteroatoms selected from, e.g., O, N, or S. In this regard, it is to be appreciated that the polymerizable monomers are not limited to those which are polymerizable by free radical polymerization. Rather, these monomers also include, for example, monomers which are polymerizable by cationic and/or anionic polymerization and/or by polycondensation. Accordingly, non-limiting examples of resins which are suitable for the purposes of the present invention include organic resins such as polyacrylates, polymethacrylates, polyvinylethers, polyvinylesters, polyesters, polyethers, polyamides, polyurethanes, polycarbonates, polysulfones, phenolic resins, epoxy resins, and mixed forms of these resins. Mixed inorganic/organic resins such as silicones (e.g., polyorganosiloxanes) are suitable as well. One particular type of resin that can be used in the present invention are aqueous resins such as, e.g., polyamide resins (for example CAS No. 175893-71-7, CAS No. 303013-12-9, CAS No. 393802-62-5, CAS No. 122380-38-5, CAS No. 9003-39-8).

Non-limiting examples of modifying resins for use in the present invention further include those which are made from one or more monomers selected from polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, dipropylene glycol diacrylates, hexanediol diacrylates, ethoxylated trimethylol propane triacrylates, and tripropylene glycol diacrylates (optionally in combination with one or more monomers which are different from the above monomers).

It is to be appreciated that a modifying resin for use in the present invention does not have to be completely cured (polymerized) or dry before it is contacted with a chiral liquid crystal precursor composition as long as it is able to withstand the components and in particular, the solvent that may be (and usually will be) present in the (uncured) chiral liquid crystal precursor composition (e.g., that the modifying resin does not get dissolved thereby to any significant extent). The curing of an only partially cured modifying resin may be completed, for example, together with the curing of the chiral liquid crystal precursor (e.g., by UV-radiation).

Figure 7:
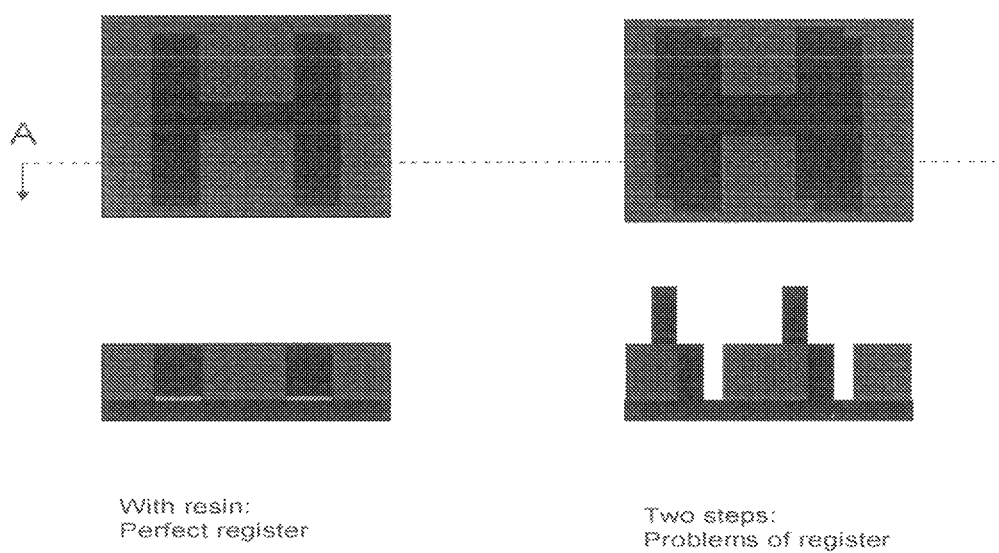
FIG. 7 shows an object of the present invention which uses a modifying resin to create perfect register, compared to other existing technologies.

Another great advantage over the existing prior art (as illustrated in, e.g., WO 2001/024106, WO 2008/127950, the entire disclosures of which are incorporated by reference herein) is the possibility to create perfect register without using mask techniques. By perfect register it is meant the possibility to have in very few steps and/or process(es) steps a single layer of liquid crystal polymer wherein two or more zones with simultaneously different color shifting properties and/or different positions of the selective reflection band are present, and these zones can be perfectly adjacent without either a gap or an overlap between them, as shown in FIG. 7. This advantage stems from the fact that the liquid crystal precursor composition is applied in one step, and its properties are locally modified by the modifying resin. To obtain a similar result without the instant method, one would have to apply and cure two or more liquid crystal precursor compositions in successive steps with excessively high precision in order for them to cover adjacent regions without gaps or overlaps (as shown in FIG. 7). The instant method allows straightforward creation of logo, marking, coding, barcode, pattern, data matrix which contains different information and/or color at the same time. The possibilities afforded by the instant method include using mixtures of modifying resins (e.g., mixtures of two, three, four or more modifying resins), both in the form of cured physical mixtures of two or more modifying resins and in the form of two or more different modifying resins which are (separately) present on different locations of the surface of the substrate. Alternatively or additionally, two or more different chiral liquid crystal precursor compositions which differ, for example, in the concentration of salt(s) contained therein and/or differ by containing different salts therein may also be used. This gives rise to a large number of possible combinations of chiral liquid crystal precursor compositions and modifying resins which may be present on the surface of a single substrate. This large number of possible combinations allows, among others, the possibility of creating a specific code and/or marking which is difficult to counterfeit because anyone who wants to reproduce it would have to know the exact composition of the chiral liquid crystal precursor composition, the type, amount, and concentration of salt(s) contained therein and the nature of the modifying resin(s). The incorporation of additional specific security elements such as, e.g., near-infrared, infrared and/or UV security elements (known exclusively to the producer of the marking) into the liquid crystal precursor composition and/or into the modifying resin, makes counterfeiting even more difficult. Accordingly, the present invention also contemplates and encompasses the use of chiral liquid crystal precursor compositions and modifying resins which comprise such additional specific security elements.

Further, in some cases it may be desirable to deliberately coat substantially the entire (or at least a large part of the) surface of the substrate with a first (modifying) resin material with modifying properties and to then apply in one or more areas of the thus coated surface a second modifying resin (or even two or more different modifying resins in different areas), where the first and second (and third, etc.) resins differ in their ability to shift the position of the selective reflection band exhibited by the cured chiral liquid crystal precursor composition (or of two or more different cured chiral liquid crystal precursor compositions).

It also is to be appreciated that the present invention is not limited to the visible range of the electromagnetic spectrum. For example, a modifying resin may shift all or a part of the selective reflection band exhibited by a cured chiral liquid crystal precursor composition from the IR range to the visible range, or from the visible range to the UV range, or from the IR range to the UV range.

The chiral liquid crystal precursor composition can be applied onto the surface of the substrate by any suitable method such as, for example, spray coating, knife coating, roller coating, screen coating, curtain coating, gravure printing, flexography, offset printing, dry offset printing, letterpress printing, screen-printing, pad printing, and ink-jet printing (for example continuous ink-jet printing, drop-on-demand ink-jet printing, valve-jet printing). In one of the embodiments of the present invention the application (e.g., deposition) of a composition for making the marking or layer and/or a composition for making the modifying resin is carried out with a printing technique such as, e.g., ink-jet printing (continuous, drop-on-demand, etc.), flexography, pad printing, rotogravure printing, screen-printing, etc. Of course, other printing techniques known by those of skill in the art of printing may be used as well. In one of the preferred embodiments of the invention flexography printing is employed both for applying the resin and for applying the chiral liquid crystal precursor composition. In another preferred embodiment of the invention, ink-jet printing techniques are used both for applying the modifying resin and for applying the chiral liquid crystal precursor composition. It is contemplated also that two different techniques can be used respectively to apply the modifying resin and the chiral liquid crystal precursor composition. The industrial ink-jet printers, commonly used for numbering, coding and marking applications on conditioning lines and printing presses, are particularly suitable. Preferred ink-jet printers include single nozzle continuous ink-jet printers (also called raster or multi level deflected printers) and drop-on-demand ink-jet printers, in particular valve-jet printers. The thickness of the applied liquid crystal polymer composition, after curing, according to the above described application techniques, will usually be at least about 1 µm, e.g., at least about 3 µm, or at least about 4 µm, and will usually be not more than about 20 µm, e.g., not more than about 15 µm, not more than about 10 µm, or not more than about 6 µm. The thickness of the applied modifying resin, after curing, according to the above described application techniques will usually be at least about 1 µm, e.g., at least about 3 µm, or at least about 5 µm, but will usually be not more than about 10 µm.

In particular if a polymer composition for use in the present invention (i.e., a composition for making a chiral liquid crystal precursor or a composition for making a modifying resin) is to be applied by the printing techniques set forth above the composition will usually comprise a solvent to adjust its viscosity to a value which is suitable for the employed application (printing) technique. Typical viscosity values for flexographic printing inks are in the range of from about 40 seconds to about 120 seconds using e.g. a cup DIN number 4. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, and mixtures of two or more thereof.

Further, in particular if a polymer composition for use in the present invention (i.e., a composition for making a chiral liquid crystal precursor or a composition for making a modifying resin) is to be applied by (continuous) ink-jet printing, the polymer composition will usually also comprise at least one conductivity agent known by those of skill in the art.

If a chiral liquid crystal precursor composition and/or a composition for making a modifying resin for use in the present invention is to be cured/polymerized by UV radiation the composition will also comprise at least one photoinitiator. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-1-butanone and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If a polymer composition for use in the present invention (i.e., a composition for making a chiral liquid crystal precursor or a composition for making a modifying resin) is to be cured by a method which is different from irradiation with UV light such as, e.g., by means of high-energy particles (e.g., electron beams), X-rays, gamma-rays, etc. the use of a photoinitiator can, of course, be dispensed with.

It may also be possible or even desirable to cure especially the composition for making a modifying resin thermally. In this case the composition will usually contain at least one thermal polymerization initiator such as, e.g., a peroxide or an azo compound. Other examples of thermal polymerization initiators are well known to those of skill in the art.

A chiral liquid crystal precursor composition and a composition for providing a modifying resin for use in the present invention may also comprise a variety of other optional components which are suitable and/or desirable for achieving a particular desired property of the composition and in general, may comprise any components/substances which do not adversely affect a required property of the composition to any significant extent. Non-limiting examples of such optional components are resins, silane compounds, adhesion promoters, sensitizers for the photoinitators (if present), etc. For example, especially a chiral liquid crystal precursor composition for use in the present invention may comprise one or more silane compounds. Non-limiting examples of suitable silane compounds include optionally polymerizable silanes such as those of formula $R_1R_2R_3$—Si—$R_4$ wherein $R_1$, $R_2$, and $R_3$ independently represent alkoxy and alkoxyalkoxy having a total of from 1 to about 6 carbon atoms and $R_4$ represents vinyl, allyl, $(C_{1-10})$alkyl, (meth)acryloxy$(C_{1-6})$alkyl, and glycidyloxy$(C_{1-6})$alkyl such as, e.g., vinyltriethoxysilane, vinyltrimethoxysilane, vinyltris(2-methoxyethoxy)silane, 3-methacryloxypropyl-trimethoxysilane, octyltriethoxysilane, and 3-glycidyloxypropyl triethoxysilane from the Dynasylan® family supplied by Evonik.

The concentration of the one or more silane compounds, if present, in the liquid crystal precursor composition will usually be from about 0.5% to about 5% by weight, based on the total weight of the composition.

In order to strengthen the security of the marking or layer according to the present invention a composition for making a modifying resin and/or a composition for making a chiral liquid crystal precursor for use in the present invention may further comprise one or more pigments and/or dyes which absorb in the visible or invisible region of the electromagnetic spectrum and/or one or more pigments and/or dyes which are luminescent and/or one or more magnetic pigments. Non-limiting examples of suitable pigments and/or dyes which absorb in the visible or invisible region of the electromagnetic spectrum include phthalocyanine derivatives. Non-limiting examples of suitable luminescent pigments and/or dyes include lanthanide derivatives. Non-limiting examples of suitable magnetic pigments include particles of transitional metal oxides such as iron and chromium oxides. The presence of pigment(s) and/or dye(s) will enhance and reinforce the security of the marking against counterfeiting.

Following the application (e.g., deposition) of the chiral liquid crystal precursor composition according to the invention onto the substrate the polymer composition is brought to a chiral liquid crystal state having specific optical properties. The term "specific optical properties" is to be understood as a liquid crystal state with a specific pitch that reflects a specific wavelength range (selective reflection band). To that end the chiral liquid crystal precursor composition is heated, the solvent contained in the composition, if present, is evaporated and the promotion of the desired chiral liquid crystal state takes place. The temperature used to evaporate the solvent and to promote the formation of the liquid crystal state depends on the components of the chiral liquid crystal precursor composition and will in many cases range from about 55° C. to about 150° C., e.g., from about 55° C. to about 100° C., preferably from about 60° C. to about 100° C. Examples of suitable heating sources include conventional heating means such as a hot plate, an oven, a stream of hot air and in particular, radiation sources such as, e.g., an IR lamp. The required heating time depends on several factors such as, e.g., the components of the polymer composition, the type of heating device and the intensity of the heating (energy output of the heating device). In many cases a heating time of from about 0.1 s, about 0.5 s, or about 1 second to about 30 seconds such as, e.g., not more than about 20 seconds, not more than about 10 seconds, or not more than about 5 seconds will be sufficient.

The marking according to the present invention is finally obtained by curing and/or polymerizing the (entire) composition in the chiral liquid crystal state. The fixing or hardening will often be performed by irradiation with UV-light, which induces polymerization of the polymerizable groups present in the polymer composition.

Accordingly, an entire process for making a marking of the present invention may comprise the following steps:

Applying a modifying resin onto a substrate;

Curing and/or drying the applied modifying resin at least partially, for instance fully;

Applying a salt-containing liquid crystal precursor composition onto a portion of the substrate that has the modifying resin thereon;

Heating the applied liquid crystal precursor composition to bring it to the cholesteric state.

Curing the heated liquid crystal precursor composition (and optionally, completing the curing and/or drying of the modifying resin) to obtain the marking according to the present invention.

The marking according to the present invention can be incorporated, for example, in a security feature, an authenticity feature, an identification feature or a tracking and tracing feature.

The following examples are intended to illustrate the invention without restricting it.

EXAMPLES

Preparation of a Chiral Liquid Crystal Precursor Composition

A chiral liquid crystal precursor composition (I) was prepared as follows, the indicated percentages being by weight based on the total weight of the composition:

A chiral dopant compound B of formula (I) shown above (4.75%), a nematic compound A1 (14%), a nematic compound A2 (14%), and cyclohexanone (66.45%) were placed into a flask which was thereafter heated until a solution was obtained. To the solution were added 2-methyl-1[4-(methylthio)phenyl]-2-morpholinopropan-1-one (Irgacure 907® from Ciba, photoinitiator, 0.6%) and isopropylthioxanthone (photoinitiator, 0.2%). The final mixture was stirred until complete dissolution was achieved to result in the chiral liquid crystal precursor composition (I).

Preparation of a Layer of a Cured Chiral Liquid Crystal Precursor Composition

The above composition (I) was coated on a substrate (transparent PET film, thickness 125 µm) and the resultant layer was heated to about 80° C. for about 30 seconds to evaporate the solvent and to develop a cholesteric liquid crystal phase, i.e., a state that shows a specific reflection band whose position depends on the concentration of the chiral dopant compound B in the composition. Thereafter the composition was cured by irradiation with a UV lamp (mercury low-pressure lamp having a UV irradiance of 10 mW/cm$^2$) for about 1 second to freeze the cholesteric liquid crystal phase through co-polymerization of the polymerizable groups of compounds A1, A2 and B. After the curing the composition was substantially free of solvent (only trace amounts of cyclohexanone were present) and comprised the above components (in polymerized form) in the following weight percentages, based on the total weight of the composition:

| | |
|---|---|
| 41.725% | Compound A1 (nematic precursor) |
| 41.725% | Compound A2 (nematic precursor) |
| 14.16% | Compound B (chiral dopant) |
| 2.39% | Photoinitiator |

The concentration of chiral dopant compound B in the cholesteric liquid crystal precursor allows to control the position of the selective reflection band and as a result thereof, the color of the cured chiral liquid crystal precursor layer. This is illustrated by FIG. 1 which is a plot of the wavelength of the maximum normal reflection as a function of the concentration of the chiral dopant compound B in the dry composition. With 14.16% of chiral dopant compound B the wavelength of the maximum normal reflection of the composition is around 510 nm, which affords a greenish blue color of the corresponding layer. As shown in FIG. 1, increasing (decreasing) the concentration of chiral dopant compound B in the composition results in a decrease (increase) of the wavelength of the maximum normal reflection.

Addition of Salt to the Chiral Liquid Crystal Precursor Composition

Figure 2:
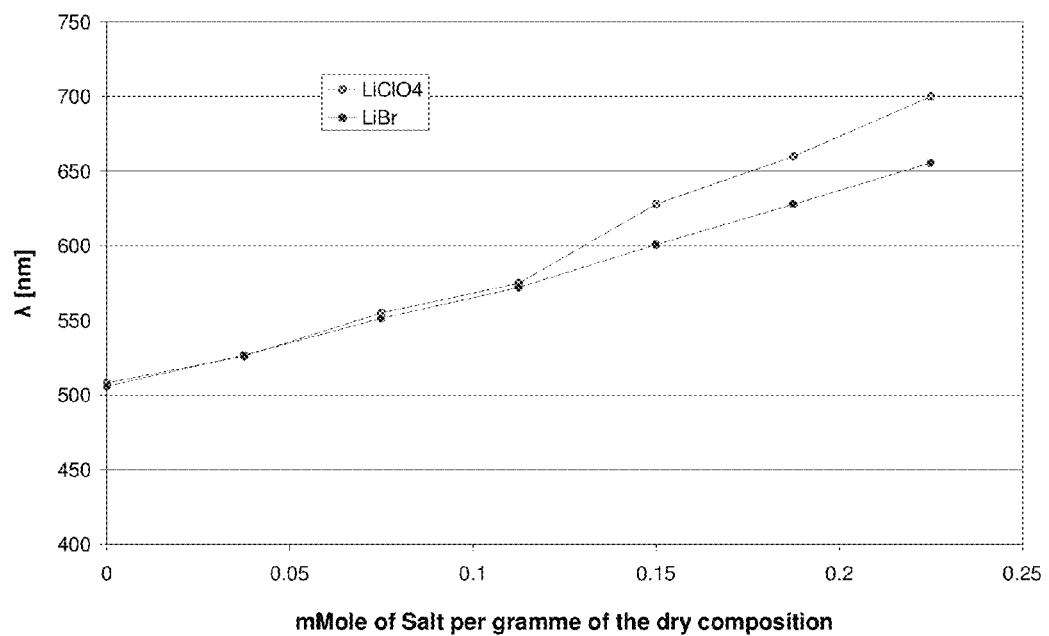
FIG. 2 is a diagram showing the position of the selective reflection band ($\lambda_{max}$) of a cured chiral liquid crystal precursor composition suitable for use in the present invention as a function of the mmoles of salt per gram of dry matter.

Two different salts, i.e., LiClO$_4$, and LiBr were added to the above chiral liquid crystal precursor composition (I). FIG. 2 illustrates the effect of the ratio of mole of salt to mole of chiral dopant compound B on the position of the selective reflection band displayed by the cured composition. As can be seen from FIG. 2, LiClO$_4$ and LiBr have a relatively strong effect on the position of the selective reflection band.

Preparation of Cured Chiral Liquid Crystal Precursor/Modifying Resin Combinations (1) Preparation of Salt-Containing Compositions The above composition (I) was modified by adding thereto two different salts, i.e., LiClO$_4$ and LiBr, in the following weight percentages (based on the total weight of the solvent containing composition, the percentage of solvent shown above being correspondingly reduced by the percentage of added salt):

Composition (Ia): 0.66% LiClO$_4$
Composition (Ib): 0.55% LiBr

The above percentages reflect the different molecular weights of the salts and result in approximately the same mole percentage of each salt in compositions (Ia) and (Ib).

Further, the following compositions for preparing a modifying resin were prepared (in % by weight, based on the total weight of the composition):

Composition (IIa):

| | | |
|---|---|---|
| 65% | Methyl Ethyl Ketone | solvent |
| 33% | Ebecryl 83 | UV curable monomer, CYTEC |
| 1% | Irgacure 907 | Photoinitiator, CIBA |
| 0.5% | Isopropylthioxanthone | Photoinitiator |
| 0.5% | Irgacure 500 | Photoinitiator, CIBA |

(Ebecryl 83 is a Low Viscosity Amine Modified Multifunctional Acrylate)

Composition (IIb):

| | | |
|---|---|---|
| 65% | Methyl Ethyl Ketone | solvent |
| 33% | Ebecryl 1608 | UV curable monomer, CYTEC |
| 1% | Irgacure 907 | Photoinitiator, CIBA |
| 0.5% | Isopropylthioxanthone | Photoinitiator |
| 0.5% | Irgacure 500 | Photoinitiator, CIBA |

(Ebecryl 1608 is a purified bisphenol A epoxy diacrylate diluted with propoxylated glycerol triacrylate)

(2) General Procedure for Making Marking:

Using a micropipette, a 2 µL droplet of Composition (IIa) or (IIb) is deposited on one side of the substrate (transparent PET film, thickness 125 µm). The substrate is placed on a heating plate (80° C.) to rapidly evaporate the solvent present in the UV resin composition.

After about 30 seconds of heating the solvent is evaporated and the deposited resin is cured using a UV lamp (mercury low-pressure lamp having a UV irradiance of 10 mW/cm$^2$) for about 1 second. The substrate is now locally coated on one side with a cured UV resin over a circular region of about 5 to 10 mm in diameter depending on the viscosity of the UV resin composition.

On the side of the substrate that carries the UV resin an about 10 µm thick layer of one of the liquid crystal precursor compositions set forth above (Composition (Ia) or (Ib)) is applied over the entire surface of the substrate using a hand coater.

The coated sample is then rapidly placed on the heating plate (80° C.) to evaporate the solvent and develop the cholesteric liquid crystal phase.

After about 30 seconds of heating the solvent is evaporated and the liquid crystal precursor composition is cured using a UV lamp (mercury low-pressure lamp having a UV irradiance of 10 mW/cm$^2$) for about 1 second. The thickness of the thus cured cholesteric liquid crystal polymer layer is about 3.3 µm.

The following combinations of compositions were employed:

Example 1: Composition (Ia)/Composition (IIa)—see FIG. 3
Example 2: Composition (Ia)/Composition (IIb)—see FIG. 4
Example 3: Composition (Ib)/Composition (IIa)—see FIG. 5
Example 4: Composition (Ib)/Composition (IIb)—see FIG. 6

In FIGS. 3 to 6 the photograph at the top shows the actual PET film sample with the approximately circular area where the modifying resin made from Composition (IIa) or Composition (IIb) was deposited (on the back of the sample is black paper which allows a dark background and a better visualization of the color differences). The diagram below the picture shows the relative reflection as a function of the wavelength for both the region with the deposited modifying resin made from Composition (IIa) or Composition (IIb) (covered by cured chiral liquid crystal precursor made from Composition (Ia) or Composition (Ib)) and the region where only cured chiral liquid crystal precursor is present. FIG. 7 is a diagram corresponding to the diagrams in FIGS. 3 to 6 (without a photograph).

Figure 3:
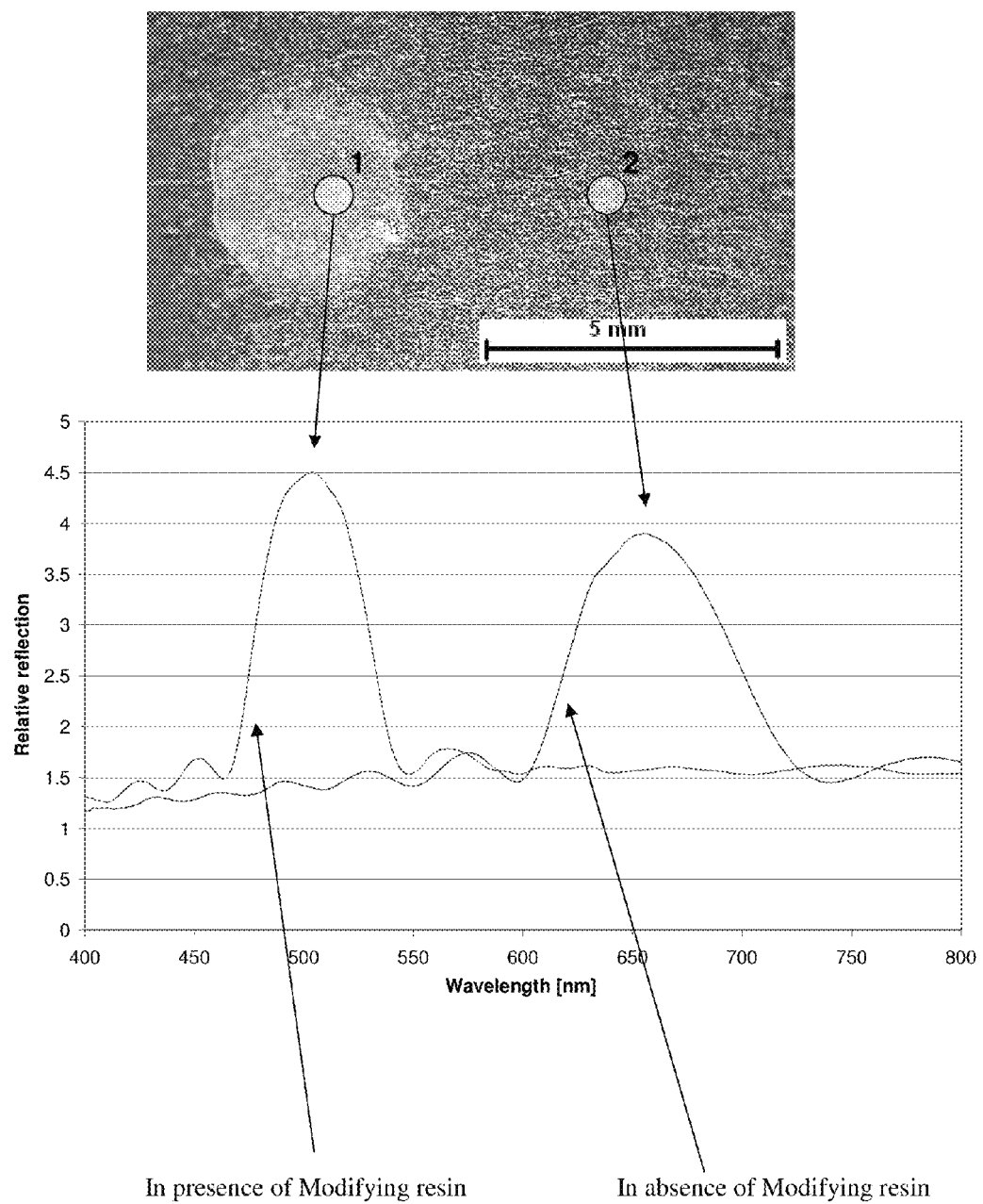
FIG. 3 shows a photograph and the corresponding diagram illustrating the effect of a first cured (modifying) resin on the of the selective reflection band ($\lambda_{max}$) of a first salt-containing cured chiral liquid crystal precursor composition suitable for use in the present invention (Example 1)

As can be seen from FIG. 3 (Example 1), the position of the selective reflection band in region 2 corresponds to the position of the selective reflection band which could have been predicted on the basis of the diagram in FIG. 2 (LiClO$_4$ curve), i.e., about 660 nm. However, in region 1 the underlying modifying resin made from Composition (IIa) significantly shifts the position of the selective reflection band to the shorter wavelength range (506 nm), which is about the same as the position of the selective reflection band of the layer made from Composition (Ia) without addition of salt (see FIG. 1 for a concentration of chiral dopant of 14.16% by weight). Accordingly, in this case the underlying modifying resin (made from Composition (IIa)) virtually cancels the effect of the presence of LiClO$_4$ on the position of the selective reflection band (color) of the cured chiral liquid crystal precursor layer.

Figure 4:
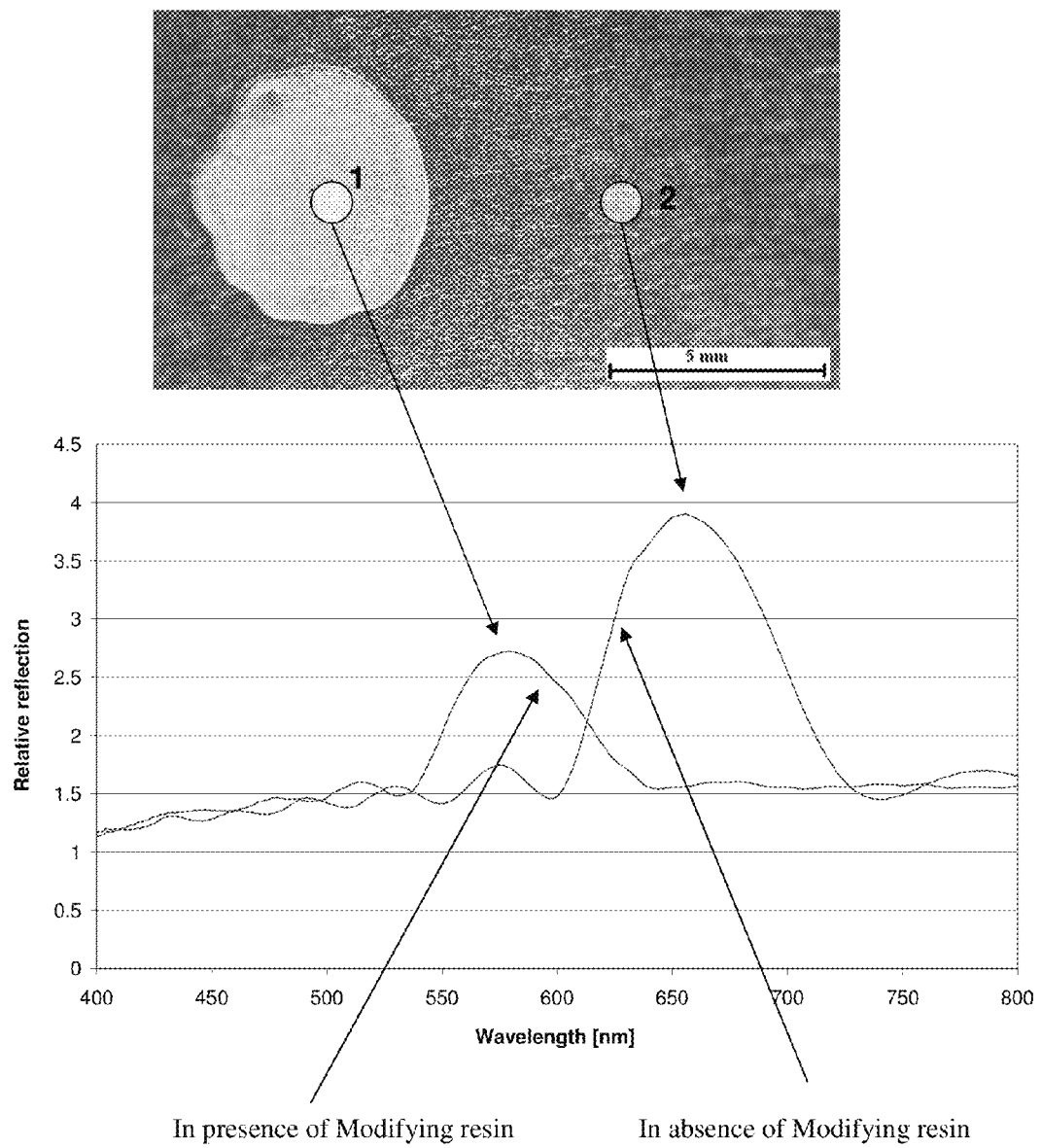
FIG. 4 shows a photograph and the corresponding diagram illustrating the effect of a second modifying resin on the position of the selective reflection band ($\lambda_{max}$) of the first cured chiral liquid crystal precursor composition used in Example 1 (Example 2)

As can be seen from FIG. 4 (Example 2), compared with FIG. 3 the modifying resin made from Composition (IIa) is more effective than the modifying resin made from Composition (IIb) with regard to its modifying properties although the latter still causes a considerable shift of the position of the selective reflection band of the cured chiral liquid crystal precursor layer (to about 580 nm).

Figure 5:
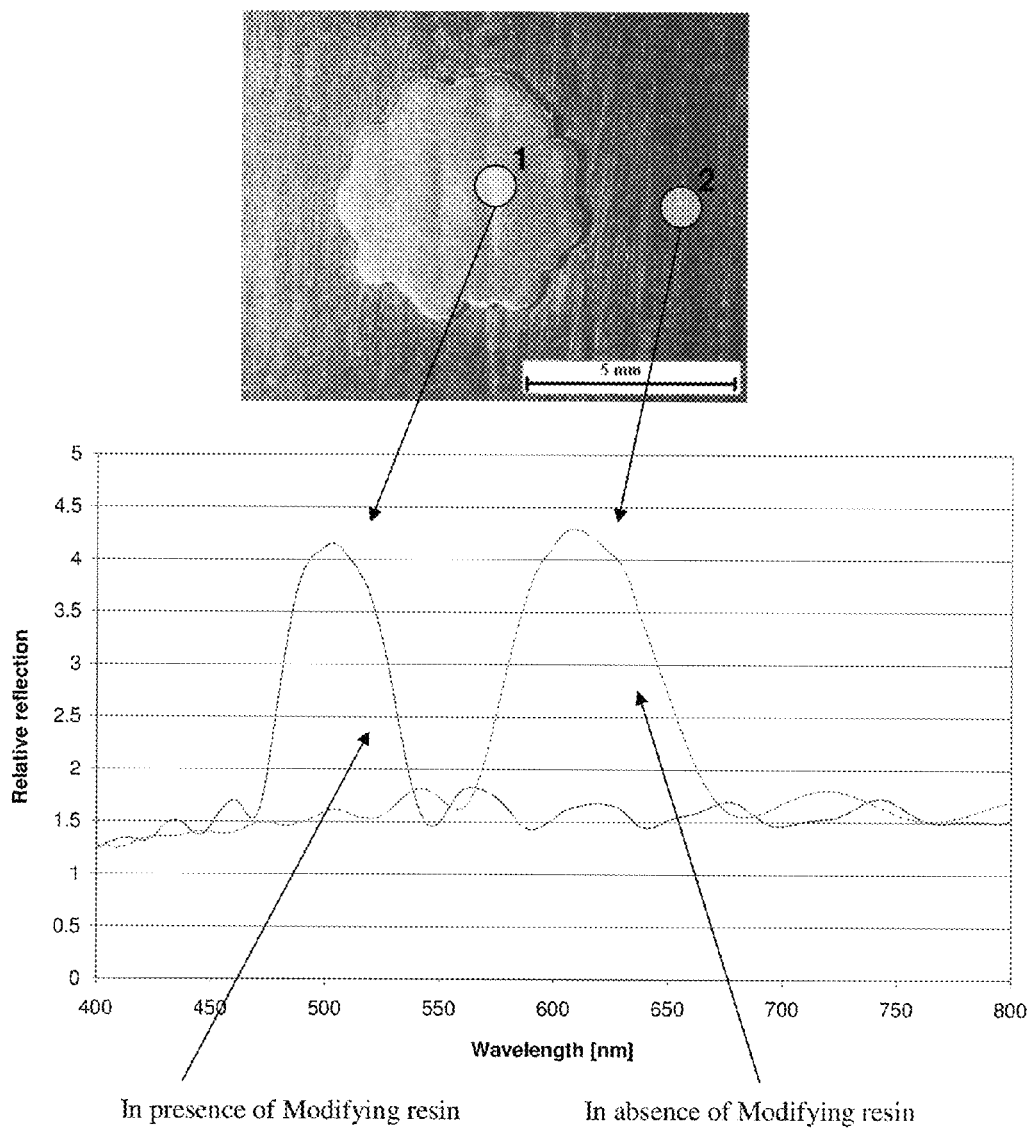
FIG. 5 shows a photograph and the corresponding diagram illustrating the effect of the first modifying resin used in Example 1 on the position of the selective reflection band ($\lambda_{max}$) of a second salt-containing cured chiral liquid crystal precursor composition (Example 3)
Figure 6:
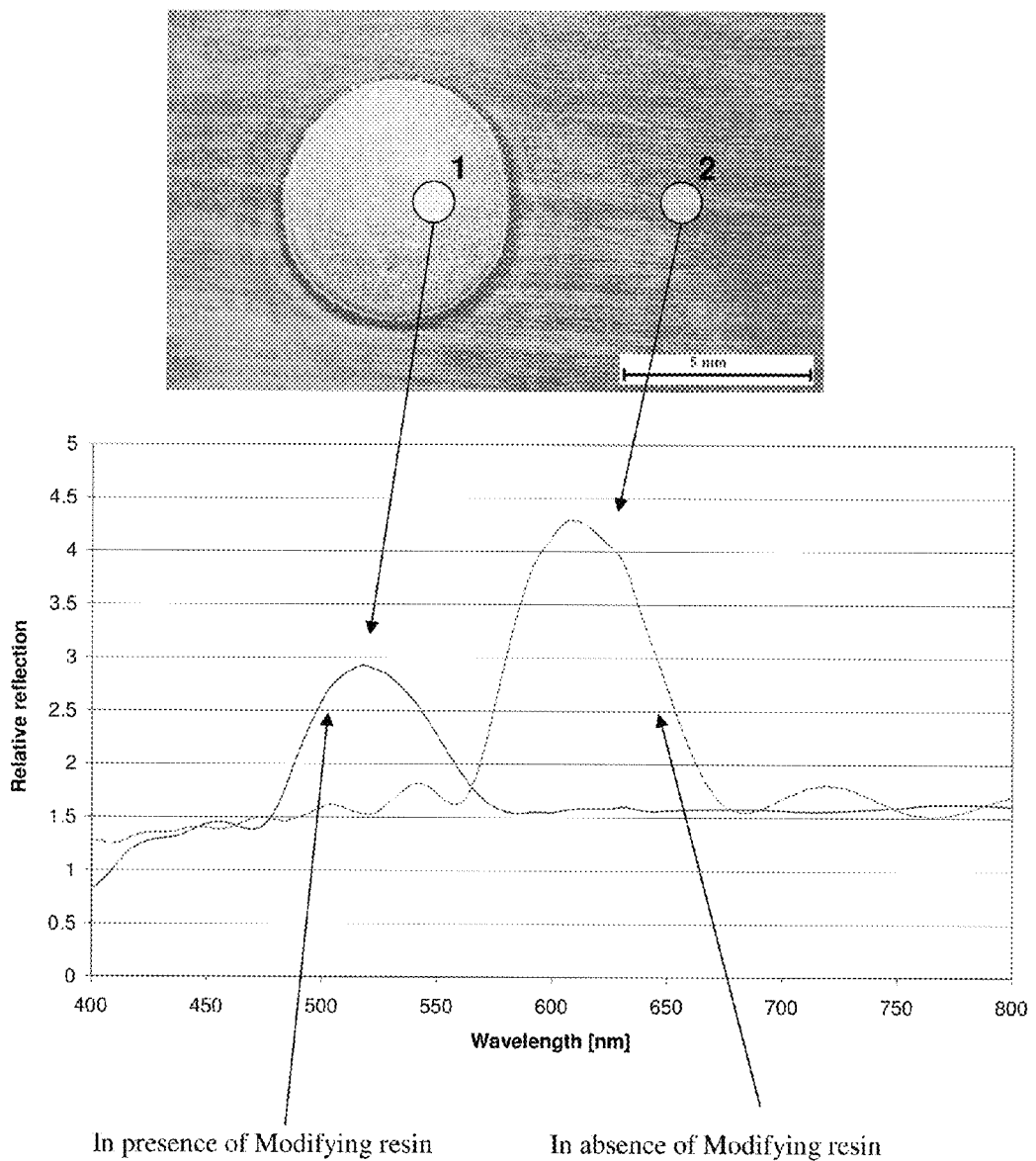
FIG. 6 shows a photograph and the corresponding diagram illustrating the effect of the second modifying resin used in Example 2 on the position of the selective reflection band ($\lambda_{max}$) of the second cured chiral liquid crystal precursor composition used in Example 3 (Example 4)

Regarding Examples 3 and 4, in the case of the presence of LiBr the underlying modifying resin made from Composition (IIa) is effective with respect to its modifying properties and is more effective in the case of the presence of LiClO$_4$, but still affords a significant shift toward shorter wavelengths (FIG. 5). Essentially the same applies to the resin made from Composition (IIb), see FIG. 6.

The above Examples demonstrate that the addition of salt to a chiral liquid crystal precursor composition can be used to shift the position of the selective reflection band of the corresponding cured polymer in a controllable manner and that both the type of salt and the concentration thereof can influence the shifting effect of a salt (in addition to the changing of the concentration of the chiral dopant). The above Examples also show that the shifting effect of the salt can be partly or completely reversed (in a controllable manner) by contacting the chiral liquid crystal precursor composition with a cured (acrylate) resin before curing the liquid crystal precursor.

The following compounds may, for example, be employed in the above Examples as chiral dopant compound B of formula (I):

(3R,3aR,6R,6aR)-hexahydrofuro[3,2-b]furan-3,6-diyl bis (4-(4-(acryloyloxy)-3-methoxybenzoyloxy)-3-methoxy-benzoate);

(3R,3aR,6R,6aR)-6-(4-(4-(acryloyloxy)-3-methoxybenzoyloxy)-3-methoxybenzoyloxy)-hexahydrofuro[3,2-b]furan-3-yl 4-(4-(acryloyloxy)benzoyloxy)-3-methoxy-benzoate;

(3R,3aR,6R,6aR)-hexahydrofuro[3,2-b]furan-3,6-diyl bis (4-(4(acryloyloxy)benzoyloxy)-benzoate);

(3R,3aR,6R,6aR)-hexahydrofuro[3,2-b]furan-3,6-diyl bis (4-(4-(acryloyloxy)butoxy)-benzoate);

(3R,3aR,6R,6aR)-hexahydrofuro[3,2-b]furan-3,6-diyl bis (4-(acryloyloxy)-2-methylbenzoate);

(3R,3aR,6S,6aR)-hexahydrofuro[3,2-b]furan-3,6-diyl bis(4-(4-(acryloyloxy)benzoyloxy)-3-methoxybenzoate);

(3R,3aR,6R,6aR)-hexahydrofuro[3,2-b]furan-3,6-diyl bis (4-(4-(acryloyloxy)-3-methoxy-benzoyloxy)benzoate);

(3R,3aR,6R,6aR)-hexahydrofuro[3,2-b]furan-3,6-diyl bis (4-(4(acryloyloxy)benzoyloxy)-3-methoxybenzoate);

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-mannitol;

2,5-bis-O-(4-{[4-(acryloyloxy)benzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-mannitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol 2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-mannitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-mannitol;

2,5-bis-O-(4-{[4-(acryloyloxy)benzoyl]oxy}-3-methoxybenzoyl)-1,4:3,6-dianhydro-D-mannitol;

2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-mannitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-mannitol;

2-O-(4-{[4-(acryloyloxy)-2-methoxy-5-methylbenzoyl]oxy}-2-methoxybenzoyl)-5-O-(4-{[4-(acryloyloxy)-5-methoxy-2-methylbenzoyl]oxy}-3-methylbenzoyl)-1,4:3,6-dianhydro-D-mannitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-mannitol;

2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-mannitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-mannitol;

2,5-bis-O-(4-{[4-(acryloyloxy)-2,5-dimethylbenzoyl]oxy}-2-ethoxybenzoyl)-1,4:3,6-dianhydro-D-mannitol;

2,5-bis-O-(4-{[4-(acryloyloxy)-2-ethoxybenzoyl]oxy}-2-ethoxybenzoyl)-1,4:3,6-dianhydro-D-mannitol;

2,5-bis-O-(4-{[4-(acryloyloxy)-2-methoxybenzoyl]oxy}-2-ethoxybenzoyl)-1,4:3,6-dianhydro-D-mannitol;

2,5-bis-O-(4-{[4-(acryloyloxy)-2-ethoxybenzoyl]oxy}-2-methoxybenzoyl)-1,4:3,6-dianhydro-D-mannitol;

2,5-bis-O-(4-{[4-(acryloyloxy)-2-ethoxybenzoyl]oxy}-3-methylbenzoyl)-1,4:3,6-dianhydro-D-mannitol;

2,5-bis-O-(4-{[4-(acryloyloxy)-2-ethoxybenzoyl]oxy}-3-methoxybenzoyl)-1,4:3,6-dianhydro-D-mannitol;

2,5-bis-O-(4-{[4-(acryloyloxy)-3-methoxybenzoyl]oxy}-3-methylbenzoyl)-1,4:3,6-dianhydro-D-mannitol;

2,5-bis-O-(4-{[4-(acryloyloxy)-3-methoxybenzoyl]oxy}-3-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-glucitol;

2,5-bis-O-(4-{[4-(acryloyloxy)benzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-glucitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2,5-bis-O-(4-{[4-(acryloyloxy)benzoyl]oxy}-3-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-glucitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-glucitol;

2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-glucitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-glucitol 2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-glucitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-glucitol 2,5-bis-O-(4-{[4-(acryloyloxy)-2,5-dimethylbenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-ethoxybenzoyl)-1,4:3,6-dianhydro-D-glucitol;

2,5-bis-O-(4-{[4-(acryloyloxy)-2-methoxybenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-methoxybenzoyl)-1,4:3,6-dianhydro-D-glucitol;

2,5-bis-O-(4-{[4-(acryloyloxy)-2-ethoxybenzoyl]oxy}-3-methylbenzoyl)-1,4:3,6-dianhydro-D-glucitol; and 2,5-bis-O-(4-{[4-(acryloyloxy)-2-ethoxybenzoyl]oxy}-3-methoxybenzoyl)-1,4:3,6-dianhydro-D-glucitol.

As nematic compound A1 in the above Examples the following compounds may, for example, be employed:

benzoic acid, 4-[[[4-[(1-oxo-2-propen-1-yl)oxy]butoxy]carbonyl]oxy]-1,1'-(2-methyl-1,4-phenylene)ester;

2-methoxybenzene-1,4-diyl bis[4-({[4-(acryloyloxy)butoxy]carbonyl}oxy)benzoate];

4-{[4-({[4-(acryloyloxy)butoxy]carbonyl}oxy)benzoyl]oxy}-2-methoxyphenyl 4-({[4-(acryloyloxy)butoxy]carbonyl}oxy)-2-methylbenzoate;

2-methoxybenzene-1,4-diyl bis[4-({[4-(acryloyloxy)butoxy]carbonyl}oxy)-2-methylbenzoate];

2-methylbenzene-1,4-diyl bis[4-({[4-(acryloyloxy)butoxy]carbonyl}oxy)-2-methylbenzoate];

4-{[4-({[4-(acryloyloxy)butoxy]carbonyl}oxy)benzoyl]oxy}-2-methylphenyl 4-({[4-(acryloyloxy)butoxy]carbonyl}oxy)-3-methoxybenzoate;

2-methylbenzene-1,4-diyl bis[4-({[4-(acryloyloxy)butoxy]carbonyl}oxy)benzoate];

2-methylbenzene-1,4-diyl bis[4-({[4-(acryloyloxy)butoxy]carbonyl}oxy)-3-methoxybenzoate];

4-{[4-({[4-(acryloyloxy)butoxy]carbonyl}oxy)-3-methoxybenzoyl]oxy}-2-methylphenyl 4-({[4-(acryloyloxy)butoxy]carbonyl}oxy)-3,5-dimethoxybenzoate;

2-methylbenzene-1,4-diyl bis[4-({[4-(acryloyloxy)butoxy]carbonyl}oxy)-3,5-dimethoxybenzoate];

2-methoxybenzene-1,4-diyl bis[4-({[4-(acryloyloxy)butoxy]carbonyl}oxy)-3,5-dimethoxybenzoate]; and 4-{[4-({[4-(acryloyloxy)butoxy]carbonyl}oxy)-3-methoxybenzoyl]oxy}-2-methoxyphenyl 4-({[4-(acryloyloxy)butoxy]carbonyl}oxy)-3,5-dimethoxybenzoate.

As nematic compound A2 in the above Examples the following compounds may, for example, be employed:

2-methyl-1,4-phenylene bis(4-(4-(acryloyloxy)butoxy)-benzoate);

4-({4-[4-(acryloyloxy)butoxy]benzoyl}oxy)-3-methylphenyl 4-[4-(acryloyloxy)butoxy]-2-methylbenzoate;

4-({4-[4-(acryloyloxy)butoxy]benzoyl}oxy)-3-methylphenyl 4-[4-(acryloyloxy)butoxy]-3-methylbenzoate;

2-methylbenzene-1,4-diyl bis{4-[4-(acryloyloxy)butoxy]-2-methylbenzoate};

4-({4-[4-(acryloyloxy)butoxy]-2-methylbenzoyl}oxy)-3-methylphenyl 4-[4-(acryloyl-oxy)butoxy]-2,5-dimethylbenzoate;

2-methylbenzene-1,4-diyl bis{4-[4-(acryloyloxy)butoxy]-2,5-dimethylbenzoate}

2-methylbenzene-1,4-diyl bis{4-[4-(acryloyloxy)butoxy]benzoate};

4-({4-[4-(acryloyloxy)butoxy]-3,5-dimethylbenzoyl}oxy)-3-methylphenyl 4-[4-(acryloyloxy)butoxy]-2,5-dimethylbenzoate;

2-methylbenzene-1,4-diyl bis{4-[4-(acryloyloxy)butoxy]-3,5-dimethylbenzoate};

2-methoxybenzene-1,4-diyl bis{4-[4-(acryloyloxy)butoxy]-3,5-dimethylbenzoate};

4-({4-[4-(acryloyloxy)butoxy]-3-methylbenzoyl}oxy)-2-methoxyphenyl 4-[4-(acryloyl-oxy)butoxy]-3,5-dimethylbenzoate;

2-methoxybenzene-1,4-diyl bis{4-[4-(acryloyloxy)butoxy]-3-methylbenzoate};

4-({4-[4-(acryloyloxy)butoxy]benzoyl}oxy)-3-methoxyphenyl 4-[4-(acryloyloxy)-butoxy]-3-methylbenzoate;

4-({4-[4-(acryloyloxy)butoxy]benzoyl}oxy)-3-methoxyphenyl 4-[4-(acryloyloxy)-butoxy]-2,5-dimethylbenzoate;

2-methoxybenzene-1,4-diyl bis{4-[4-(acryloyloxy)butoxy]-2-methoxybenzoate};

2-methoxybenzene-1,4-diyl bis{4-[4-(acryloyloxy)butoxy]-3,5-dimethoxybenzoate};

2-methoxybenzene-1,4-diyl bis{4-[4-(acryloyloxy)butoxy]-3-methoxybenzoate};

2-ethoxybenzene-1,4-diyl bis{4-[4-(acryloyloxy)butoxy]benzoate};

2-ethoxybenzene-1,4-diyl bis{4-[4-(acryloyloxy)butoxy]-2-methylbenzoate};

2-(propan-2-yloxy)benzene-1,4-diyl bis{4-[4-(acryloyloxy)butoxy]benzoate};

4-({4-[4-(acryloyloxy)butoxy]benzoyl}oxy)-2-(propan-2-yloxy)phenyl 4-[4-(acryloyl-oxy)butoxy]-2-methylbenzoate;

2-(propan-2-yloxy)benzene-1,4-diyl bis{4-[4-(acryloyloxy)butoxy]-2-methylbenzoate};

2-(propan-2-yloxy)benzene-1,4-diyl bis{4-[4-(acryloyloxy)butoxy]-2,5-dimethylbenzoate};

2-(propan-2-yloxy)benzene-1,4-diyl bis{4-[4-(acryloyloxy)butoxy]-3,5-dimethylbenzoate}; and 2-(propan-2-yloxy)benzene-1,4-diyl bis{4-[4-(acryloyloxy)butoxy]-3,5-dimethoxybenzoate}.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The entire disclosure of concurrently filed U.S. application Ser. No. 13/313,242, filed Dec. 7, 2011, entitled "SIMPLIFIED CONTROL OF COLOR SHIFTING PROPERTIES OF A CHIRAL LIQUID CRYSTAL POLYMER", which published as US 2012-0141745 A1 and issued as U.S. Pat. No. 8,951,438, is incorporated by reference herein.

What is claimed is:

1. A substrate having thereon a marking or layer comprising a cured chiral liquid crystal precursor composition formed from a chiral liquid crystal precursor composition, wherein the chiral liquid crystal precursor composition comprises at least one salt that changes a position of a selective reflection band exhibited by the cured chiral liquid crystal precursor composition compared to a position of a selective reflection band exhibited by the cured chiral liquid crystal composition that does not contain the at least one salt, and wherein a modifying resin made from one or more polymerizable monomers is disposed between the substrate and the marking or layer and in contact with the marking or layer in one or more areas thereof, the modifying resin changing a position of the selective reflection band exhibited by the cured chiral liquid crystal precursor composition formed from a chiral liquid crystal precursor composition comprising the at least one salt on the substrate in the one or more areas; and wherein at least one of the one or more polymerizable monomers for providing the modifying resin is selected from polyether acrylates, modified polyether acrylates, polyester acrylates, modified polyester acrylates, hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, aliphatic di-acrylates, bisphenol A epoxy acrylates, modified bisphenol A epoxy acrylates, epoxy acrylates, modified epoxy acrylates, acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, and ethoxylated trimethylol propane triacrylate.

2. The substrate of claim 1, wherein the chiral liquid crystal precursor composition comprises (i) one or more nematic compounds A and (ii) one or more chiral dopant compounds B which are capable of giving rise to a cholesteric state of the chiral liquid crystal precursor composition.

3. The substrate of claim 2, wherein the chiral liquid crystal precursor composition comprises at least two compounds A.

4. The substrate of claim 2, wherein the one or more nematic compounds A as well as the one or more chiral dopant compounds B comprise at least one compound that comprises at least one polymerizable group.

5. The substrate of claim 4, wherein the at least one polymerizable group comprises an unsaturated carbon-carbon bond.

6. The substrate of claim 5, wherein the at least one polymerizable group comprises a group of formula $H_2C=CH-C(O)-$.

7. The substrate of claim 2, wherein all of the one or more nematic compounds A and all of the one or more chiral dopant compounds B comprise at least one polymerizable group.

8. The substrate of claim 1, wherein the chiral liquid crystal precursor composition comprises at least one chiral dopant compound B of formula (I):

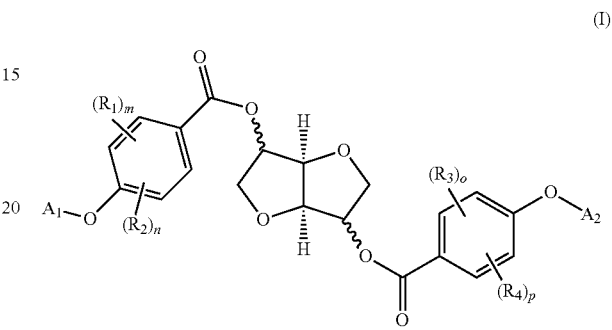

(I)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

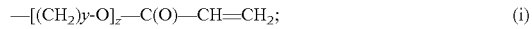

$-[(CH_2)_y-O]_z-C(O)-CH=CH_2;$ (i)

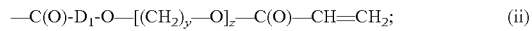

$-C(O)-D_1-O-[(CH_2)_y-O]_z-C(O)-CH=CH_2;$ (ii)

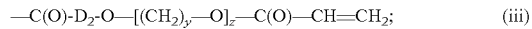

$-C(O)-D_2-O-[(CH_2)_y-O]_z-C(O)-CH=CH_2;$ (iii)

$D_1$ denotes a group of formula

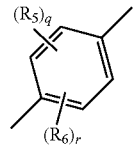

$D_2$ denotes a group of formula

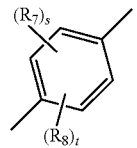

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

9. The substrate of claim 1, wherein the at least one salt is selected from metal salts and ammonium salts.

10. The substrate of claim 9, wherein the at least one salt comprises at least one of lithium perchlorate, lithium nitrate, lithium tetrafluoroborate, lithium bromide, lithium chloride, tetrabutylammonium perchlorate, tetrabutylammonium chloride, tetrabutylammonium tetrafluoroborate, tetrabutylammonium bromide, sodium carbonate, sodium chloride, or sodium nitrate.

11. The substrate of claim 9, wherein the at least one salt comprises a metal salt.

12. The substrate of claim 11, wherein a metal of the metal salt is selected from alkali and alkaline earth metals.

13. The substrate of claim 12, wherein a metal of the metal salt is selected from Li and Na.

14. The substrate of claim 13, wherein a metal of the metal salt comprises Li.

15. The substrate of claim 1, wherein at least one of the one or more polymerizable monomers for providing the modifying resin comprises at least two unsaturated carbon-carbon bonds.

16. The substrate of claim 1, wherein at least one of the one or more polymerizable monomers for providing the modifying resin comprises at least one group of formula $H_2C=CH—C(O)—$ or $H_2C=C(CH_3)—C(O)—$.

17. The substrate of claim 1, wherein the modifying resin comprises a radiation-cured resin.

18. The substrate of claim 17, wherein the radiation-cured modifying resin comprises a UV-cured resin.

19. The substrate of claim 1, wherein the modifying resin comprises a dried aqueous resin.

20. The substrate of claim 1, wherein the modifying resin shifts a position of the selective reflection band exhibited by the cured chiral liquid crystal precursor composition comprising the at least one salt, by at least about 5 nm.

21. The substrate of claim 1, wherein the modifying resin shifts a position of the selective reflection band exhibited by the cured chiral liquid crystal precursor composition comprising the at least one salt, to shorter wavelengths.

22. The substrate of claim 1, wherein at least a part of the selective reflection band exhibited by the cured chiral liquid crystal precursor composition that has been shifted by the modifying resin is in the visible range.

23. The substrate of claim 1, wherein at least one of the one or more areas which carry the modifying resin is in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, or a data matrix.

24. The substrate of claim 1, wherein at least a part of the cured chiral liquid crystal precursor composition is in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, or a data matrix.

25. The substrate of claim 1, wherein the substrate is or comprises at least one of a label, packaging, a cartridge, a container or a capsule that contains foodstuffs, nutraceuticals, pharmaceuticals, or beverages, a banknote, a credit card, a stamp, a tax label, a security document, a passport, an identity card, a driver's license, an access card, a transportation ticket, an event ticket, a voucher, an ink-transfer film, a reflective film, an aluminum foil, or a commercial good.

26. A method of providing a marking on a substrate, wherein the method comprises:
  a) applying onto a surface of a substrate which carries a modifying resin made from one or more polymerizable monomers in one or more areas of the surface of the substrate a curable chiral liquid crystal precursor composition in such a way that the curable chiral liquid crystal precursor composition covers at least a part of the one or more areas carrying the modifying resin and also covers at least one area of the surface that does not carry the modifying resin, the curable chiral liquid crystal precursor composition comprising at least one salt that changes a position of a selective reflection band exhibited by the curable chiral liquid crystal precursor composition after curing compared to a position of a selective reflection band exhibited by the curable liquid crystal precursor composition after curing that does not contain the at least one salt;
  b) heating the curable liquid crystal precursor composition to bring same to a chiral liquid crystal state; and
  c) curing the curable liquid crystal precursor composition in the chiral liquid crystal state to form a cured liquid crystal precursor composition;
  and wherein the modifying resin shifts the position of the selective reflection band exhibited by the cured chiral liquid crystal precursor composition comprising the at least one salt, on the substrate in the one or more areas in which the modifying resin is present; and wherein at least one of the one or more polymerizable monomers for providing the modifying resin is selected from polyether acrylates, modified polyether acrylates, polyester acrylates, modified polyester acrylates, hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, aliphatic di-acrylates, bisphenol A epoxy acrylates, modified bisphenol A epoxy acrylates, epoxy acrylates, modified epoxy acrylates, acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, and ethoxylated trimethylol propane triacrylate.

27. The method of claim 26, wherein b) comprises heating the curable liquid crystal precursor composition to a temperature of from about 55° C. to about 150° C.

28. The method of claim 26, wherein the curable liquid crystal precursor composition is applied by at least one of spray coating, knife coating, roller coating, screen coating, curtain coating, gravure printing, flexography, screen-printing, pad printing, continuous ink-jet printing, drop-on-demand ink-jet printing, or valve-jet printing.

29. The method of claim 26, wherein the curable liquid crystal precursor composition is applied in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, or a data matrix.

30. The method of claim 26, wherein the modifying resin is present in at least one of the one or more areas in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, or a data matrix.

31. The method of claim 26, wherein the modifying resin has been provided on the substrate by at least one of spray coating, knife coating, roller coating, screen coating, curtain coating, gravure printing, flexography, offset printing, dry offset printing, letterpress printing, screen-printing, pad printing, continuous ink-jet printing, drop-on-demand ink-jet printing, or valve-jet printing.

32. The method of claim 26, wherein the substrate is or comprises at least one of a label, packaging, a cartridge, a container or a capsule that contains foodstuffs, beverages, nutraceuticals or pharmaceuticals, a banknote, a credit card, a stamp, a tax label, a security document, a passport, an identity card, a driver's license, an access card, a transportation ticket, an event ticket, a voucher, an ink-transfer film, a reflective film, an aluminum foil, or a commercial good.

33. A substrate provided with a marking, wherein the substrate is obtained by the method of claim 26.

34. A method of changing a position of a selective reflection band exhibited by a cured chiral liquid crystal precursor composition of a marking or layer on a substrate, the cured chiral liquid precursor composition formed from a curable chiral liquid precursor composition comprising (i) one or more nematic compounds, (ii) one or more chiral dopant compounds which are capable of giving rise to a cholesteric state of the cured liquid crystal precursor composition, and (iii) at least one salt that changes a position of a selective reflection band exhibited by the cured liquid crystal precursor composition compared to a position of a selective reflection band exhibited by the cured chiral liquid crystal precursor composition that does not contain the at least one salt, wherein the method comprises contacting the curable liquid crystal precursor composition with a modifying resin which is made from one or more polymerizable monomers, the modifying resin being disposed between the substrate and the marking or layer and in contact with the marking or layer in one or more areas thereof, at least one of the polymerizable monomers for providing the modifying resin is selected from polyether acrylates, modified polyether acrylates, polyester acrylates, modified polyester acrylates, hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, aliphatic di-acrylates, bisphenol A epoxy acrylates, modified bisphenol A epoxy acrylates, epoxy acrylates, modified epoxy acrylates, acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, and ethoxylated trimethylol propane triacrylate; and the modifying resin changing the position of the selective reflection band exhibited by the cured chiral liquid crystal precursor composition comprising the at least one salt.

35. The method of claim 34, wherein a position of the selective reflection band is shifted by the modifying resin by at least about 5 nm.

* * * * *